(12) United States Patent
Valero et al.

(10) Patent No.: US 10,401,523 B2
(45) Date of Patent: Sep. 3, 2019

(54) SYSTEMS AND METHODS FOR ESTIMATING TIME OF FLIGHT FOR AN ACOUSTIC WAVE

(71) Applicant: Schlumberger Technology Corporation, Sugar Land, TX (US)

(72) Inventors: Henri-Pierre Valero, Clamart (FR); Vivien Seguy, Kanagawa (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 54 days.

(21) Appl. No.: 15/325,785

(22) PCT Filed: Jul. 16, 2015

(86) PCT No.: PCT/IB2015/001195
§ 371 (c)(1),
(2) Date: Jan. 12, 2017

(87) PCT Pub. No.: WO2016/009266
PCT Pub. Date: Jan. 21, 2016

(65) Prior Publication Data
US 2017/0176621 A1    Jun. 22, 2017

Related U.S. Application Data

(60) Provisional application No. 62/025,479, filed on Jul. 16, 2014.

(51) Int. Cl.
*G01V 1/40* (2006.01)
*E21B 47/00* (2012.01)
(Continued)

(52) U.S. Cl.
CPC ............ *G01V 1/50* (2013.01); *E21B 47/14* (2013.01)

(58) Field of Classification Search
CPC .................. G01V 1/50; E21B 47/14
(Continued)

(56) References Cited

U.S. PATENT DOCUMENTS

| 4,760,563 A * | 7/1988 | Beylkin .................. G01V 1/32 367/43 |
| 5,899,958 A | 5/1999 | Dowell et al. |

(Continued)

OTHER PUBLICATIONS

International Search Report and Written Opinion issued in corresponding International application PCT/IB2015/001195 dated Nov. 24, 2015. 11 pages.
(Continued)

*Primary Examiner* — Daniel L Murphy

(57) ABSTRACT

An example method for estimating a time of flight ("TOF") for an acoustic wave generated by an acoustic source for each of a plurality of acoustic receivers in an array can include recording data corresponding to the acoustic wave received at each of the acoustic receivers, estimating a respective TOF for the acoustic wave for each of the acoustic receivers, and discarding one or more of the respective estimated TOFs. Each of the discarded TOFs can be a statistical outlier. The method can also include calculating a plurality of time delays for the acoustic wave using a plurality of non-discarded estimated TOFs, and updating the respective estimated TOFs for the acoustic wave for each of the acoustic receivers using the calculated time delays. Each of the time delays can be a difference between respective estimated TOFs for the acoustic wave for at least two of the acoustic receivers.

20 Claims, 19 Drawing Sheets

(51) Int. Cl.
  *G01V 1/50* (2006.01)
  *E21B 47/14* (2006.01)
(58) Field of Classification Search
  USPC .......................................................... 367/25
  See application file for complete search history.

(56) References Cited

U.S. PATENT DOCUMENTS

| | | |
|---|---|---|
| 9,651,699 B2 * | 5/2017 | Snow ........................ G01V 1/50 |
| 2005/0204808 A1 | 9/2005 | Difoggio |
| 2009/0238037 A1 | 9/2009 | Zeroug et al. |
| 2012/0294112 A1 | 11/2012 | Pearce et al. |
| 2014/0177388 A1 | 6/2014 | D'Angelo |

OTHER PUBLICATIONS

International Preliminary Report on Patentability issued in corresponding International application PCT/IB2015/001195 dated Jan. 26, 2017. 10 pages.

* cited by examiner

Direction of Propagation →

$$\frac{\sin \theta_1}{V_m} = \frac{\sin \theta_2}{V_p} = \frac{\sin \theta_s}{V_s}$$

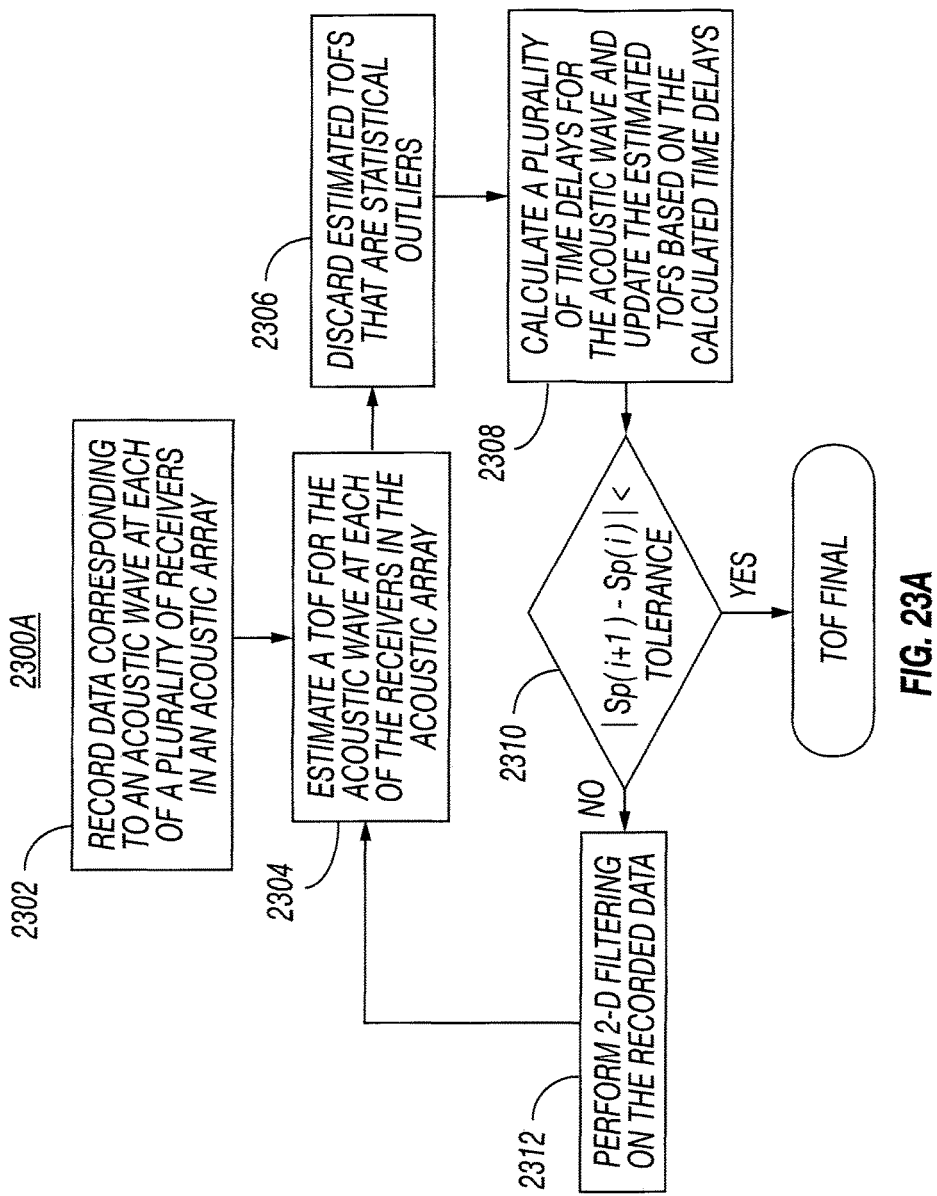

SYSTEMS AND METHODS FOR ESTIMATING TIME OF FLIGHT FOR AN ACOUSTIC WAVE

CROSS-REFERENCE TO RELATED APPLICATIONS

This application claims priority to U.S. Provisional Patent Application Ser. No. 62/025,479, which was filed on Jul. 16, 2014, and is incorporated herein by reference.

BACKGROUND

In order to get as much information as possible about the properties of a formation surrounding a borehole, modern sonic-logging technology has developed over the last few decades. For example, an acoustic source or a transmitter, e.g., a monopole, dipole, quadrupole, etc. source, emits an acoustic wave inside the borehole. The resulting acoustic wave is then recorded with an acoustic array after it has reached the borehole walls and traveled through the formation via elastic waves. Data analysis on the recorded waveforms provides useful information about the geophysical properties of the borehole. Such information is composed of the slowness of the different types of waves traveling through the formation, as well as the dispersion curves when the slowness is frequency dependent.

Sonic tools have been designed in order to operate simultaneously with the drilling of the borehole. Such tools are called logging-while-drilling ("LWD") tools and are linked to a bit within a bottom hole assembly ("BHA"). Processing sonic data obtained from LWD is a challenging task because the recorded waveforms experience a low signal to noise ratio ("SNR") due to the drilling noise, for example, any noise generated by the drilling operation such as the sound of the bit grinding the rock and/or any shocks of the BHA against the borehole walls. The noisy data acquired by LWD sonic logging requires robust techniques to extract useful information.

SUMMARY

Described herein are robust automated techniques to estimate first-arrival times of compressional waves ("P-waves") on Drilling and Measurement ("D&M") acoustic monopole data. Estimating first-arrival times can be a challenging task because D&M data experience a very low signal to noise ratio, making the conventional first-motion detection algorithms unreliable. Hence several signal processing tools are described for use together in order to build a robust algorithm. First, after using a first-motion detection algorithm, outliers are detected and discarded. The remaining outputs allow for windowing of the signal around the P-wave arrivals, and then calculating the time delays between the waveforms. These time delays are useful information for two reasons. First, the time delays can be used to greatly reduce the error on the first-arrival estimations. Secondly, the time delays can provide an approximate value of the P-slowness. Knowing the P-slowness, the data can be filtered, for example, using either two-dimensional ("2-D") Fourier transform or the Radon transform of all the waveforms at once, reducing efficiently the noise. Then, repeating this three steps scheme for few iterations provides reliable estimations of first-arrival times. Two example applications for the first-arrival time estimates are also described. First, the P-slowness deduced from these techniques is very close to the P-slowness calculated by Slowness Time Coherence ("STC") on both wireline and D&M data. Another application may be the borehole diameter and/or mud slowness estimations.

An example method for estimating a time of flight ("TOF") for an acoustic wave generated by an acoustic source for each of a plurality of acoustic receivers in an array can include recording data corresponding to the acoustic wave received at each of the acoustic receivers, estimating a respective TOF for the acoustic wave for each of the acoustic receivers, and discarding one or more of the respective estimated TOFs. Each of the discarded TOFs can be a statistical outlier. The method can also include calculating a plurality of time delays for the acoustic wave using a plurality of non-discarded estimated TOFs, and updating the respective estimated TOFs for the acoustic wave for each of the acoustic receivers using the calculated time delays. Each of the time delays can be a difference between respective estimated TOFs for the acoustic wave for at least two of the acoustic receivers. Additionally, the method can optionally further include determining a compressional wave ("P-wave") slowness value based on the calculated time delays, filtering the recorded data using a two-dimensional filtering transform based on the P-wave slowness value, and re-performing, using the filtered recorded data, the steps of estimating the respective TOF for the acoustic wave for each of the acoustic receivers, discarding one or more of the respective estimated TOFs, calculating the plurality of time delays and updating the respective estimated TOFS using the calculated time delays.

Optionally, the two-dimensional filtering transform can be an F-K transform or a Radon transform, wavelet transform, curvelet, or any other transformation allowing to represent the data in two dimensions. Alternatively or additionally, the TOF for the acoustic wave for each of the acoustic receivers can optionally be estimated using a first-arrival time detection algorithm. For example, the first-arrival time detection algorithm can be an entropy algorithm, a threshold based algorithm, or a statistical algorithm based. Alternatively or additionally, a plurality of time delays for the acoustic wave can optionally be calculated using a high-order statistical algorithm. For example, the high-order statistical algorithm can be a bicoherence correlation algorithm, a coherence-correlation algorithm, a cross-correlation algorithm, bispectral-algorithm.

Additionally, one or more of the respective estimated TOFs can be discarded by performing a least-squares regression on the estimated TOFs, calculating a standard deviation of differences between the estimated TOFs and respective values of the least-squares regression for the acoustic wave for each of the acoustic receivers, and if an absolute value of a difference between an estimated TOF for the acoustic wave for a given acoustic receiver and a value of the least-squares regression for the acoustic wave for the given acoustic receiver is greater than the standard deviation, discarding the estimated TOF for the acoustic wave for the given receiver.

Optionally, the method can further include, upon discarding one or more of the respective estimated TOFs, windowing respective portions of the recorded data corresponding to the acoustic wave for each of the acoustic receivers around each of the non-discarded estimated TOFs and disregarding data outside each of the respective windowed portions. For example, disregarding data outside each of the respective windowed portions can include, but is not limited to, setting the data outside each of the respective windowed portions to zero or a flag value. Accordingly, the data outside each of the respective windowed portions can be identified and not used (e.g., ignored, disregarded, etc.) in the remaining calculations.

Alternatively or additionally, the method can include determining a P-wave slowness value based on the updated TOFs for the acoustic wave for each of the acoustic receivers. For example, determining the P-wave slowness value for each of the acoustic receivers can include performing a least-squares regression on the updated TOFs, and calculating a slope of a best-fitting line obtained by the least-squares regression.

Optionally, the acoustic source and the array can be located in a borehole. Additionally, the method can further include inverting a diameter of the borehole and/or a mud slowness value based on the updated TOFs for the acoustic wave for each of the acoustic receivers.

An example system for estimating a TOF for an acoustic wave can include an acoustic tool and a control unit. The acoustic tool can include at least one acoustic source configured to generate an acoustic wave and an array including a plurality of acoustic receivers. The control unit can include at least one processor and a memory. In addition, the control unit can be configured to record data corresponding to the acoustic wave received at each of the acoustic receivers, estimate a respective TOF for the acoustic wave for each of the acoustic receivers, and discard one or more of the respective estimated TOFs. Each of the discarded TOFs can be a statistical outlier. The control unit can also be configured to calculate a plurality of time delays for the acoustic wave using a plurality of non-discarded estimated TOFs, and update the respective estimated TOFs for the acoustic wave for each of the acoustic receivers using the calculated time delays. Each of the time delays can be a difference between respective estimated TOFs for the acoustic wave for at least two of the acoustic receivers.

Additionally, the control unit can be further configured to determine a P-wave slowness value based on the calculated time delays, filter the recorded data using a two-dimensional filtering transform based on the P-wave slowness value, and re-perform, using the filtered recorded data, the steps of estimating the respective TOF for the acoustic wave for each of the acoustic receivers, discarding one or more of the estimated TOFs, calculating the plurality of time delays and updating the estimated TOFS using the calculated time delays.

Optionally, the two-dimensional filtering transform can be an F-K transform or a Radon transform. Alternatively or additionally, the TOF for the acoustic wave for each of the acoustic receivers can optionally be estimated using a first-arrival time detection algorithm. For example, the first-arrival time detection algorithm can be an entropy algorithm an entropy algorithm. Alternatively or additionally, a plurality of time delays for the acoustic wave can optionally be calculated using a high-order statistical algorithm. For example, the high-order statistical algorithm can be a bicoherence correlation algorithm.

Additionally, one or more of the respective estimated TOFs can be discarded by performing a least-squares regression on the estimated TOFs, calculating a standard deviation of differences between the estimated TOFs and respective values of the least-squares regression for the acoustic wave for each of the acoustic receivers, and if an absolute value of a difference between an estimated TOF for the acoustic wave for a given acoustic receiver and a value of the least-squares regression for the acoustic wave for the given acoustic receiver is greater than the standard deviation, discarding the estimated TOF for the acoustic wave for the given receiver.

Optionally, the control unit can be further configured to, upon discarding one or more of the respective estimated TOFs, window respective portions of the recorded data corresponding to the acoustic wave for each of the acoustic receivers around each of the non-discarded estimated TOFs and disregard data outside each of the respective windowed portions. For example, disregarding data outside each of the respective windowed portions can include, but is not limited to, setting the data outside each of the respective windowed portions to zero or a flag value. Accordingly, the data outside each of the respective windowed portions can be identified and not used (e.g., ignored, disregarded, etc.) in the remaining calculations.

Alternatively or additionally, the control unit can be configured to determine a P-wave slowness value based on the updated TOFs for the acoustic wave for each of the acoustic receivers. For example, determining the P-wave slowness value for each of the acoustic receivers can include performing a least-squares regression on the updated TOFs, and calculating a slope of a best-fitting line obtained by the least-squares regression.

Optionally, the acoustic source and the array can be located in a borehole. Additionally, the control unit can be further configured to invert a diameter of the borehole and/or a mud slowness value based on the updated TOFs for the acoustic wave for each of the acoustic receivers.

It should be understood that the above-described subject matter can be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIGS. 23A-23B are flow diagrams illustrating example operations for estimating a TOF for an acoustic wave generated by an acoustic source for each of a plurality of acoustic receivers in an acoustic array.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for estimating a TOF for an acoustic wave for each of a plurality of acoustic receivers in an array located in a borehole, it will become evident to those skilled in the art that the implementations are not limited thereto, but are applicable for estimating a TOF for an acoustic wave for each of a plurality of acoustic receivers in an array located in other environments such as land surface, marine streamer, horizontal and vertical wells, cased and open hole.

Borehole Sonic Logging

Example Environment

Figure 1:
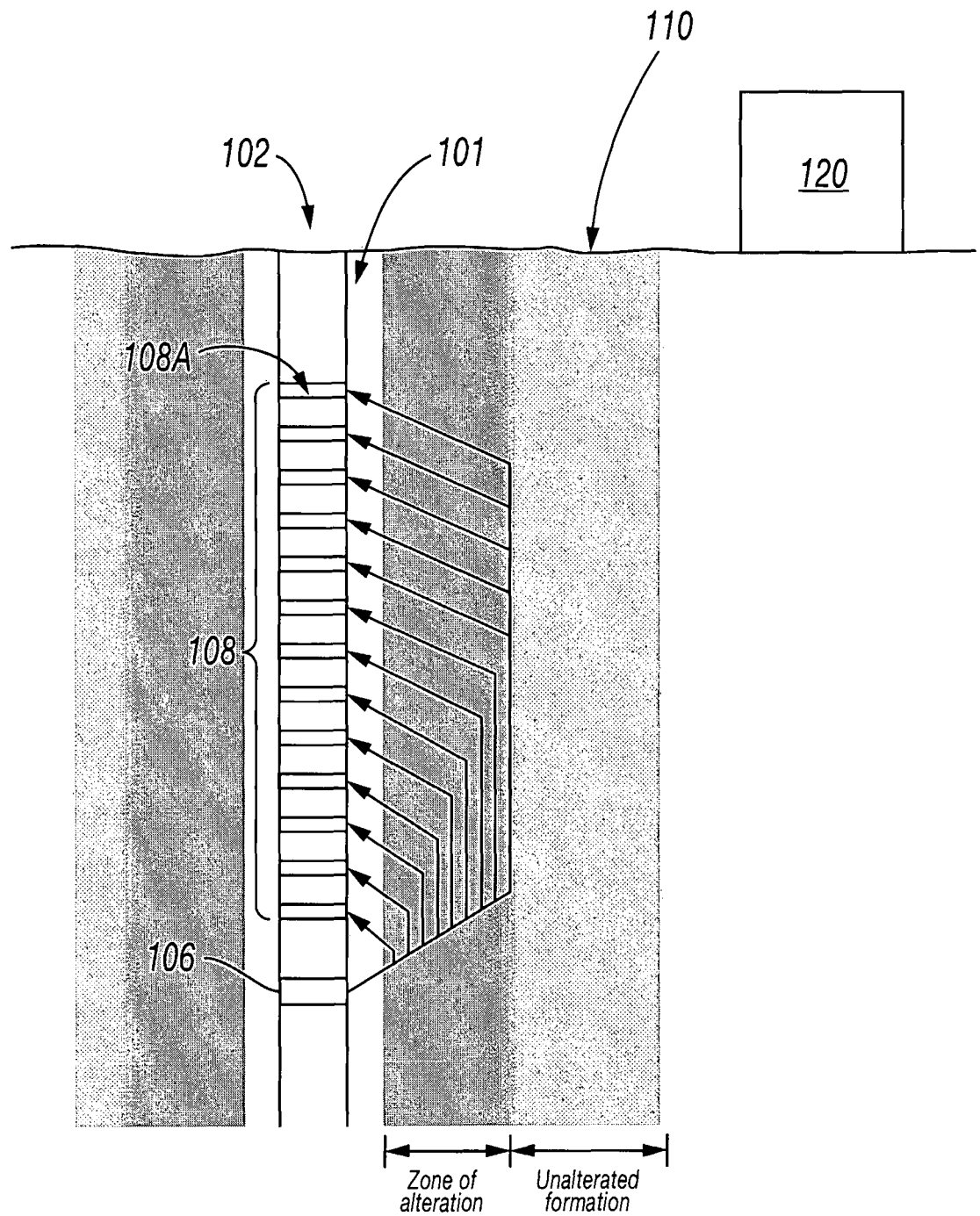
FIG. 1 is a diagram illustrating a sonic logging tool located in a borehole.

Referring now to FIG. 1, a diagram of a sonic logging tool inside a borehole (or wellbore) 102 in a formation 110 is shown. The formation 110 can contain a desirable fluid such as oil or gas. As shown in FIG. 1, the borehole 102 is a vertical wellbore drilled in the formation 110. The borehole 102 can be used to extract the desirable fluid. Optionally, the borehole 102 can be a fluid-filled wellbore, e.g., filled with a drilling fluid 101 (e.g., a liquid or gas). The borehole 102 can have an acoustic tool arranged therein. An acoustic tool (or logging tool, sonic tool, etc.) can include at least one acoustic source (e.g., acoustic source 106) and an array of acoustic receivers 108. The acoustic source 106 and the array of acoustic receivers 108 can be part of an acoustic logging tool of any type, including but not limited to, a wire line logging tool, a logging while drilling ("LWD") tool or a measurement while drilling ("MWD") tool. Logging tools are well known in the art and are therefore not discussed in further detail below.

The acoustic source 106 can be configured to excite a monopole waveform, for example, a spherical acoustic wave where energy is emitted equally in all directions and the wavefront is perpendicular to the direction of wave propagation. Although monopole waveforms are described in the examples below, this disclosure contemplates that the acoustic source 106 can be configured to excite other types of waveforms, including but not limited to dipole or quadrupole waveforms. It should be understood that the acoustic source 106 is configured to transmit energy (e.g., acoustic waves) into the formation 110. The energy can be characterized by its frequency and wavelength. Optionally, the acoustic source 106 can transmit broadband energy at frequencies between 0.5 and 20 kHz, for example. The transmitted energy can excite compressional, shear, Stoneley, flexural and/or quadrupole waves in the formation 110. Additionally, the array of acoustic receivers 108 is configured to detect the compressional, shear, Stoneley, flexural or quadrupole waves travelling in the drilling fluid 101, for example. It should be understood that the energy transmitted by the acoustic source 106 can be reflected and/or refracted from the fluid-formation interface. The array of acoustic receivers 108 can optionally include a plurality of acoustic receivers (e.g., receivers 108A). In addition, the acoustic receivers can be equally spaced along the borehole axis. The waveform emitted by the acoustic source 106 can be recorded at each of the acoustic receivers of the array of acoustic receivers 108. By arranging acoustic receivers in an array with different spacing from the acoustic source 106, it is possible to improve signal quality and extract various borehole signals over a broad frequency band. In addition, it should be understood that the borehole 102, as well as the acoustic source 106 and the array of acoustic receivers 108, are provided only as examples and are not intended to be limiting.

The acoustic tool (e.g., the acoustic source 106 and the array of acoustic receivers 108) can be operably connected with a control unit 120. It should be understood that the control unit 120 can optionally be located above, on and/or below the surface of the formation 110. Alternatively or additionally, the control unit 120 can be integrated with the acoustic tool and arranged in the borehole 102. The control unit 120 can optionally be configured to control the acoustic source 106 and/or the array of acoustic receivers 108, as well as receive, process and store sonic data (e.g., the acoustic data detected, collect, recorded, etc. by the acoustic receivers 108). In its most basic configuration, the control unit 120 typically includes at least one processing unit and system memory. Depending on the exact configuration and type of control unit 120, system memory may be volatile (such as random access memory (RAM)), non-volatile (such as read-only memory (ROM), flash memory, etc.), or some combination of the two. The processing unit can be a standard programmable processor that performs arithmetic and logic operations necessary for operation of the control unit 120.

For example, the processing unit can be configured to execute program code encoded in. tangible, computer-readable media. Computer-readable media refers to any media that is capable of providing data that causes the control unit 120 (i.e., a machine) to operate in a particular fashion. Various computer-readable media may be utilized to provide instructions to the processing unit for execution. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In addition, the control unit 120 can have additional features/functionality. For example, the control unit 120 may include additional storage such as removable storage and non-removable storage including, but not limited to, magnetic or optical disks or tapes. The control unit 120 may also contain network connection(s) that allow the device to communicate with other devices. The control unit 120 may also have input device(s) such as a keyboard, mouse, touch screen, etc. Output device(s) such as a display, speakers, printer, etc. may also be included. The additional devices may be connected to the bus in order to facilitate communication of data among the components of the control unit 120. All these devices are well known in the art and need not be discussed at length here.

Wave Equations

For an homogeneous medium, Newton's second law of motion is shown by Eqn. (1).

$$\rho \frac{\partial^2 u_i}{\partial t^2} = \partial_j \tau_{ij} + f_i, \tag{1}$$

where $\rho$ is the mass density, u is the particle displacement, $\tau$ is the stress tensor, and $f_i$ is the sum of the external body forces. In the absence of body forces, the homogeneous momentum equation is shown by Eqn. (2).

$$\rho \frac{\partial^2 u_i}{\partial t^2} = \partial_j \tau_{ij}. \tag{2}$$

The displacements induced by seismic waves are very small. Assuming that the medium is isotropic, then the linear stress-strain relationship shown in Eqn. (3) is used.

$$\tau_{ij} = \lambda \delta_{ij} \nabla \cdot u + 2\mu e_{ij}, \tag{3}$$

where $\lambda$ and $\mu$ are the Lame parameters. The strain tensor is shown by Eqn. (4).

$$e_{ij} = \frac{1}{2}(\partial_i u_j + \partial_j u_i). \tag{4}$$

By substituting Eqn. (3) into Eqn. (2), Eqn. (5) is obtained.

$$\rho \frac{\partial^2 u}{\partial t^2} = \tag{5}$$

$$(\nabla \cdot u)\nabla \lambda + \nabla \mu \cdot (\nabla u + (\nabla u)^T) + (\lambda + 2\mu)\nabla(\nabla \cdot u) - \mu \nabla \wedge (\nabla \wedge u).$$

In Eqn. (5), the right hand side involves the gradients of the Lame parameters. These gradients are nonzero as longus the medium is inhomogeneous. However, by solving Eqn. (5) on several layers, each of them being inhomogeneous, it is possible to ignore these terms. Then, the solution in the whole medium is calculated using transmission and reflection coefficients. Another reason for discarding these terms is that their modulus will tend to zero at high frequencies. Within this approximation, Eqn. (5) becomes Eqn. (6).

$$\rho \frac{\partial^2 u}{\partial t^2} = (\lambda + 2\mu)\nabla(\nabla \cdot u) - \mu \nabla \wedge (\nabla \wedge u). \tag{6}$$

Eqn. (6) is referred to as the seismic wave equation.

Now, taking the divergence of Eqn. (6), the wave equation corresponding to the compressional waves, or P-waves, shown in Eqn. (7) is obtained.

$$\nabla^2(\nabla \cdot u) - \frac{1}{\alpha^2} \frac{\partial^2(\nabla \cdot u)}{\partial t^2} = 0, \tag{7}$$

where $\alpha$, which is shown in Eqn. (8), is the wave speed.

$$\alpha = \sqrt{\frac{\lambda + 2\mu}{\rho}}. \tag{8}$$

Figure 2A:
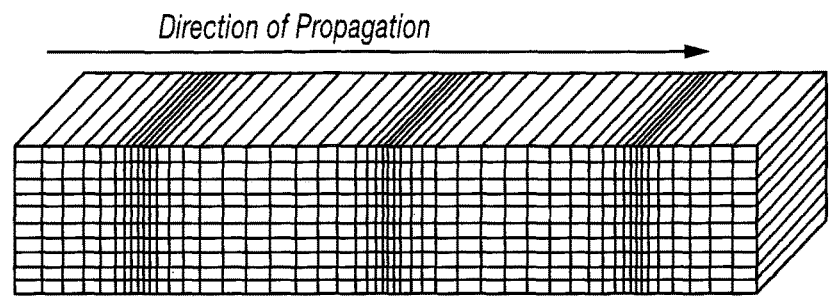
FIG. 2A is a diagram illustrating particle motion induced by a compressional wave.

The particle motion induced by P-waves is parallel to the wave propagation direction, as it is for acoustic waves in fluids or gas. For example, the particle motion induced by P-waves is shown in FIG. 2A. Now taking the rotational of Eqn. (6), another wave equation, corresponding to shear waves, or S-waves, which is shown by Eqn. (9) is obtained.

$$\nabla^2 (\nabla \wedge u) - \frac{1}{\beta^2} \frac{\partial^2 (\nabla \wedge u)}{\partial t^2} = 0, \quad (9)$$

where $\beta$, which is shown in Eqn. (10) is the S-wave speed.

$$\beta = \sqrt{\frac{\mu}{\rho}}. \quad (10)$$

Figure 2B:
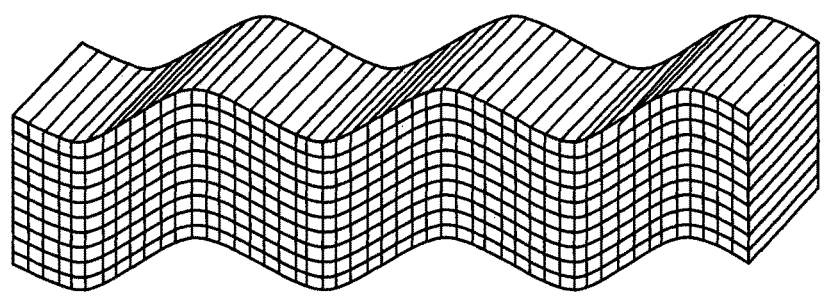
FIG. 2B is a diagram illustrating particle motion induced by a shear wave polarized vertically.

The particle motion induced by S-waves is perpendicular to the propagation direction. For example, the particle motion induced by S-waves is shown in FIG. 2B. This motion is due to the tangential stress in the medium. Hence, such waves cannot propagate in fluid or gas where there are no tangential forces. The divergence of the displacement is null, $\nabla \cdot u = 0$, which means that the volume of any element of the medium does not change. Like other transverse waves such as electromagnetic waves, they exhibit properties as polarization.

Ray Tracing and Snell's Law $V_m$ is the acoustic wave speed in the borehole mud, $V_P$ is the P-wave speed and $V_S$ is the S-wave speed. It should be understood that $V_P > V_S$, and hence, P-waves are always detected first at acoustic receivers. Generally, $V_S > V_m$, and particular media where $V_m > V_S$ are called slow formations.

To investigate the path followed by acoustic waves through both the mud and the formation, it is helpful to use ray tracing. This technique provides good approximation of the real wave propagation path when the wavefronts can be approximated as planes, or when the wavelength is much smaller than the borehole diameter. A ray is a line which is parallel to the wave propagation direction and which represents the fastest path between two points. At the interface between the borehole mud and formation, Snell's law, which is shown by Eqn. (11), determines the propagation direction of the refracted P- and S-waves.

$$\frac{1}{V_m} \sin \theta_1 = \frac{1}{V_P} \sin \theta_2 = \frac{1}{V_S} \sin \theta_S. \quad (11)$$

Figure 3:
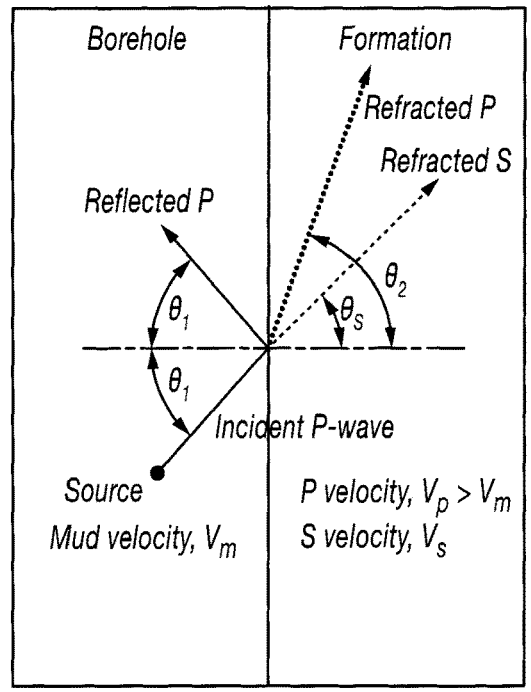
FIG. 3 is a diagram illustrating the reflected and refracted waves through the fluid-formation interface using ray tracing.

FIG. 3 is a diagram illustrating the reflected and refracted waves through the fluid-formation interface using ray tracing. The incident P-wave arrives at the interface with incidence $\Theta_1$. In the borehole, the reflected P-wave has incidence $-\Theta_1$. In the formation, the incidence of the refracted P-wave (dotted line) and refracted S-wave (dashed line) are determined by the Snell's law.

Figure 4:
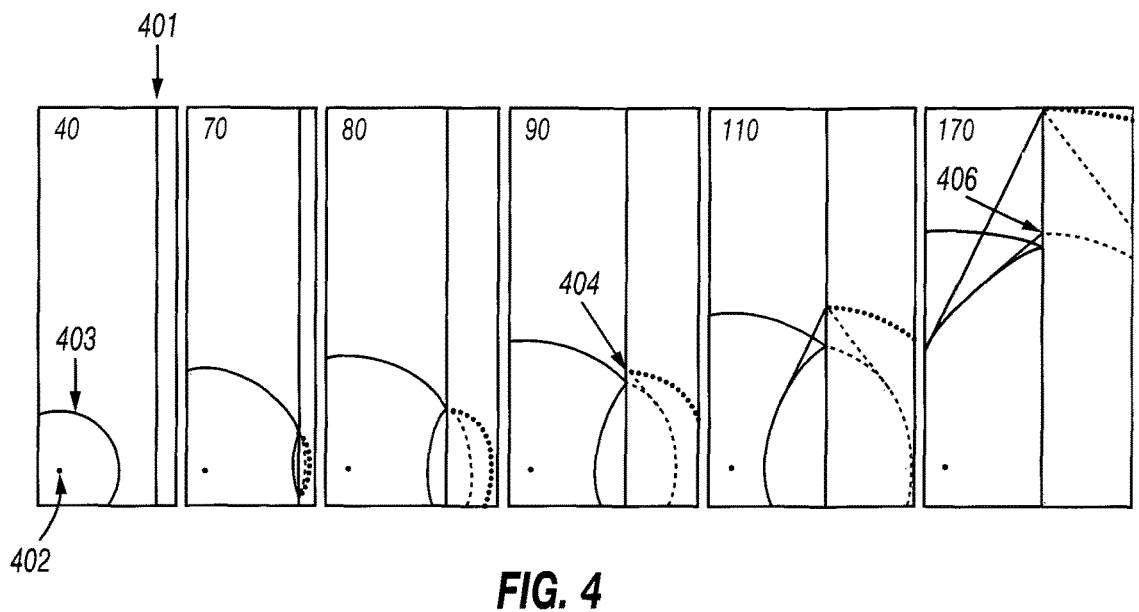
FIG. 4 is a diagram illustrating the creation of P-head waves and S-head waves.

When the refraction angle is equal to 90°, the refracted waves propagate parallel to the mud-formation interface. According to Huygens principle, every point of the interface, when excited by a P- or S-wave, acts as a secondary source for P- and S-waves, in both the borehole and the formation. The resulting waves are called head-waves. FIG. 4 is a diagram illustrating the creation of P-head waves 404 and S-head waves 406. For example, FIG. 4 shows the wavefronts generated by a monopole source 402 at the center of the borehole. In the formation, the dotted lines correspond to the wavefront of the transmitted P-wave and the dashed lines correspond to the wavefront of the transmitted S-wave. When the angle between the incident acoustic wave 403 and the formation reaches a particular value determined by the Snell's law, a head wave is generated. The S head wave 406 occurs later than the P head wave 404 since $V_S < V_P$. If $V_S < V_m$, e.g., in a slow formation, no S head wave is generated according to the Snell's law. The compressional head wave, which is generated by the P-wave propagating along the formation-mud interface 401, is the first to arrive at the receivers.

The last arrival generated by a monopole source and detected by the receivers are acoustic waves which are generated by the Stoneley waves traveling through the formation. Stoneley waves are surface waves that propagate along the mud-formation interface, and whose amplitude decreases exponentially away from the interface (evanescence property). This decay is frequency-dependent, high frequencies decay faster than low frequencies. Also, whereas P- and S-waves in isotropic media are non-dispersive, Stoneley waves are slightly dispersive, which means that their velocity depends on the frequency. Amplitude and speed of low-frequency Stoneley waves are sensitive to the permeability of the formations and to the fractures. Hence, the study of these waves provides information about these two properties of the formation in the neighborhood of the interface.

First Arrival Time-Picking

Figure 5:
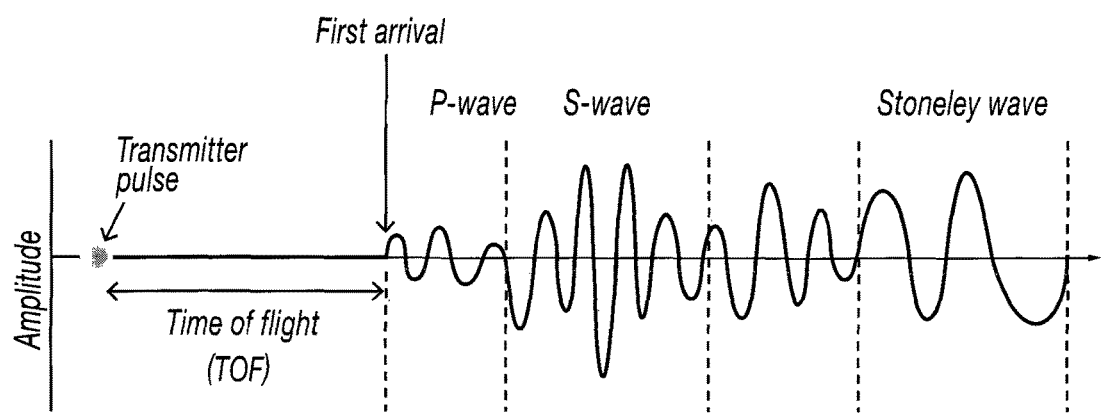
FIG. 5 is a graph illustrating the first-arrival time and TOF on a recorded waveform.

Provided below are techniques for automatic estimation of first-arrival times on the waveforms recorded by the sonic tools (e.g., the sonic tool described with regard to FIG. 1). These techniques are sometimes referred to herein as first-arrival time detection algorithms. There are many terms in the field of seismic data processing that all refer to the same time point, the most used being first-arrival, first-motion, or first-break. The first-arrival time corresponds to the time at which a wave, generated by an acoustic source (e.g., the acoustic source 106 shown in FIG. 1), arrives to the receiver (e.g. each receiver in the array of acoustic receivers 108 shown in FIG. 1), while the time of flight ("TOF") corresponds to the amount of time elapsed between the emission of the wave by the acoustic source, and the first-arrival time. FIG. 5 is a graph illustrating the first-arrival time and TOF on a recorded waveform. In the following examples, TOF and first-arrival are equal since the time t=0 is set at the start of the acoustic source signal emission. Focusing on the borehole sonic case, the first-arrival time will refer to the time at which the compressional P-wave arrives at each receiver in the array of acoustic receivers (e.g. the array of acoustic receivers 108 shown in FIG. 1), since they have the highest velocity in the formation. More precisely, it is the time at which the wavefront of the head-wave generated by the travel of the P-wave through the borehole fluid-formation interface arrives at an acoustic receiver.

Figure 6:
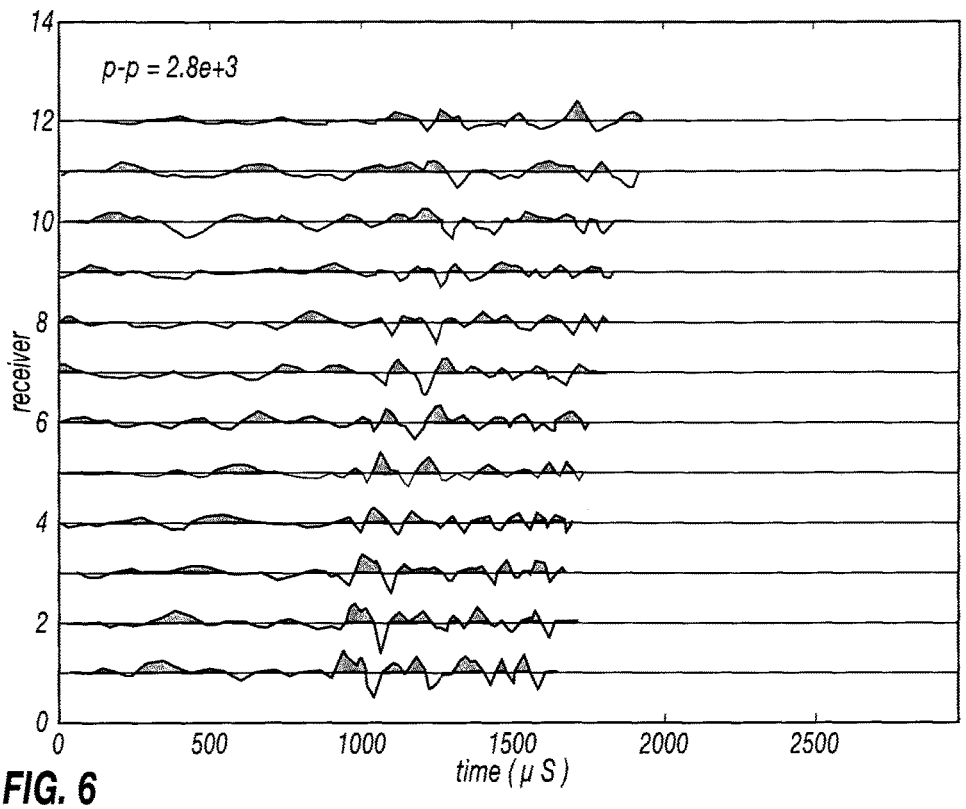
FIG. 6 is a graph illustrating an example waveform set obtained in a LWD experiment.

When the signal to noise ratio ("SNR") is high, as it may be the case in wireline sonic logging, estimating times of flight by visual inspection may be an easy task and may provide highly accurate estimations. As well, many automated algorithms have been put forward during the last decades, in order to avoid intervention of any human operator, hence processing rapidly the thousands of waveforms recorded. These automated algorithms can provide as well highly accurate times of flight estimations, as long as the SNR remains high. However, the robustness of these algorithms decreases heavily in the presence of high amplitude noise, or when the waveforms are corrupted with arrivals of undesired waves, e.g., under low SNR conditions such as when data is recorded during LWD operations. Accordingly, the examples below focus on the data recorded by sonic tools during a LWD operation. The waveforms recorded in such a situation experience a very low SNR. The drilling noise may have an amplitude nearly equal to the P-wave amplitude, and some high amplitude tube waves (similar to Stoneley waves) can be generated by some shocks experienced by the sonic tool against the borehole walls. Another undesired wave is the one generated by the transmitter and which travels directly through the collar until the receiver array. Hence, it has a high velocity and arrives before the P-wave, interfering with it and making accurate TOF estimations a difficult task. FIG. 6 is a graph illustrating an example waveform set obtained in LWD experiment. By examining FIG. 6, it should be understood how challenging finding accurate first-arrival times can be, for example, even an expert in acoustics may have trouble estimating first-arrival times with reasonable accuracy. In particular, conventional techniques for picking automatically first-arrivals may be far away from having the desired robustness desired in D&M data processing. Hence, the techniques described herein for automatically estimating first arrivals and/or TOF can improve the reliability of the results as compared to the conventional techniques.

Conventional First-Arrival Time Detection Algorithms

The most widely used techniques to pick up first-arrival times use the ratio of energy of the signal within two distinct windows. For example, it is possible to take, at any time, the ratio between the energy of the signal a forward window and a backward window as shown in Eqn. (12).

$$\tau_i = \frac{\sum_{j=i}^{i+n_w} x_j^2}{\sum_{j=i-n_w-1}^{i-1} x_j^2}, \quad (12)$$

where $x_i$ are the signal samples and $n_w$ is the length of the window. The maximum of the energy ratio provides an estimation of the first-arrival time. This technique captures well the first arrival time as long as the SNR is high. However, for low SNR, it may provide biased estimation of arrival times. Hence, several other methods using energy calculations have been put forward.

For example, the short time average, long time average ("STA/LTA") algorithm computes the ratio of the energy between a short time window and a long time window as shown in Eqns. (13) and (14).

$$STA = \sum_{j=i-n_s}^{i} x_j^2, \quad (13)$$

$$LTA = \sum_{j=i-n_l}^{i} x_j^2, \quad (14)$$

where $n_s$ and $n_l$ are the sizes of the short and long time windows. Then, as shown in Eqn. (15), a ratio between the STA and LTA is defined.

$$r_i = \frac{STA}{LTA} \quad (15)$$

Finally, the numerical derivative of r is calculated as shown by Eqn. (16).

$$d_i = r_{i+1} - r_i. \quad (16)$$

The index for which d is maximum provides an estimation of the first arrival time. This method is one of the most widely used among the seismic processing community.

A modified energy ratio technique is now provided. After calculating the energy ratio between a forward and backward window, a modified energy ratio is calculated as shown by Eqn. (17).

$$\tilde{r}_i = (|x_i| \cdot r_i)^3, \quad (17)$$

and the peak is closed to the first arrival time.

Another class of algorithms uses autoregressive representations of the signal in order to determine the arrival time. First, a set of data points($x_1 \ldots x_N$) which contains the onset of the noise free signal is needed. Then, this sequence is divided in two intervals, one preceding and one including the onset. In each interval, the data is fit with an autoregressive representation of order M as shown in Eqn. (18).

$$x_t = \sum_{m=1}^{M} a_m^{(i)} x_{t-m} + \eta_t^{(i)}, \quad (18)$$

with t=1, ..., M, for interval 1, and t=N−M+1, ..., N, for interval 2. The process η is assumed to be white Gaussian, with $E((\eta_t^{(i)})^2)=\sigma_i^2$. An arbitrary integer K such that M+1<K<N−M−1 is then chosen. Since it is assumed that η is white Gaussian, the maximum likelihood function using data from intervals [M+1, K] and [K+1,N−M] can be expressed as shown in Eqn. (19).

$$\mathcal{L}(x; K, M, \Omega_1, \Omega_2) = \prod_{i=1}^{2} \left[ \left( \frac{1}{2\pi\sigma_i^2} \right)^{n_i/2} \exp\left( -\frac{1}{2\sigma_i^2} \sum_{j=p_i}^{q_i} \left( x_j - \sum_{m=1}^{M} a_m^{(i)} x_{j-m} \right)^2 \right) \right], \quad (19)$$

where $\Omega_i = (a_1^{(i)}, \ldots, a_M^{(i)}, \sigma_i^2)$, and $p_1=M+1$, $p_2=K+1$, $q_1=K$, $q_2=N-M$, $n_1=K-M$, $n_2=N-M-K$. Maximizing the log-likelihood is shown in Eqn. (20).

$$\frac{\partial \log(\mathcal{L}(x; K, M, \Omega_1, \Omega_2))}{\partial \Omega_i} = 0, \quad (20)$$

The solution is then shown in Eqn. (21).

$$\sigma_i^2 = \frac{1}{n_i} \sum_{j=p_i}^{q_i} \left( x_j - \sum_{m=1}^{M} a_m^{(i)} x_{j-m} \right)^2. \quad (21)$$

Going back to Eqn. (19) and substituting these values, the following formula for the log likelihood as a function of K is obtained, which is shown in Eqn. (22).

$$\log(\mathcal{L}(x; K, M, \Omega_1, \Omega_2)) = \quad (22)$$
$$\frac{1}{2}(K-M)\log(\sigma_1^2) - \frac{1}{2}(N-M-K)\log(\sigma_2^2) + C,$$

where C is a constant. The value of K for which the log likelihood function (Eqn. (19)) is maximized provides an estimation of the first-arrival time.

A similar technique first provides an approximate estimation of the first-break. It has been shown to perform very well on high quality data. There are several drawbacks however. First, it needs to provide arbitrary order for the AR, i.e., autoregressive process, processes modeling within the two windows. Second, this algorithm requires the estimations of all the AR parameters, which can be accurately calculated only if enough samples within the window of interest are available. This will not be the case with sonic logging field data, which contain 256 samples on the full signal length.

An entropy method may be used for picking first-arrivals. In the entropy method, the entropy of the signal x, given a time window of length $n_w$ is defined by Eqn. (23).

$$H_i = \log\left(\frac{1}{n_w} \sum_{j=i-n_w}^{i} |x_i - x_{i-1}|\right). \tag{23}$$

The entropy will be rapidly varying when the time window moves from a noise only part to a signal plus noise part. As a result, it is expected the first-break should occur nearly the maximum of the entropy function derivative. In order to prevent high variability of the entropy, while it preserves enough information about the noise free signal, the size of the time window should be equal to few periods of the signal.

Edge Preserving Smoothing Method

Figure 7A:
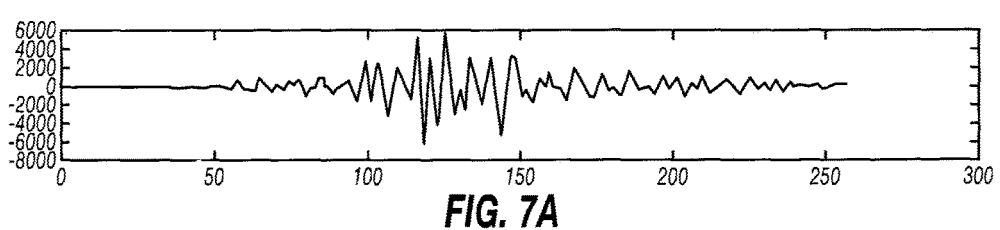
FIGS. 7A-7C are graphs illustrating an example recorded waveform and entropy function.
Figure 7B:
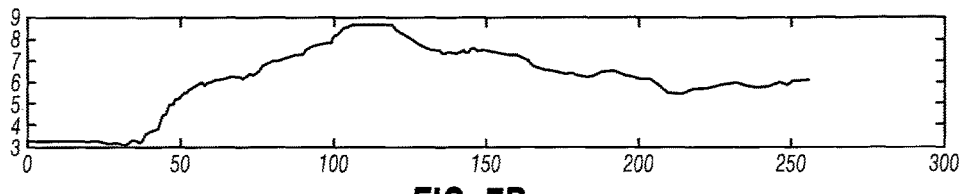
Figure 7C:
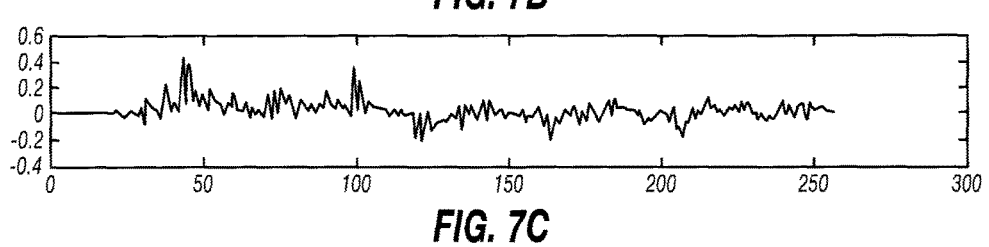

The edge preserving smoothing ("EPS") method is a powerful tool in order to better estimate the maxima of a numerical derivative, which is needed in both the STA/LTA and entropy methods. Indeed, because of the noise and the irregularity of the signals, the derivatives of either entropy or STA/LTA ratio are highly variable, leading to maxima which do not necessarily correspond to any arrivals. FIGS. 7A-7C illustrate an example recorded waveform and entropy function. FIG. 7A is the recorded waveform. FIG. 7B is the entropy function. Additionally, the numerical derivative of the entropy function, which is shown in FIG. 7C, appears to have numerous peaks, which can lead to a biased estimation of the first arrival. The variability of the entropy function is therefore shown in FIGS. 7A-7C, where it is difficult to distinguish the peak corresponding to the first arrival. The EPS method is designed to solve this problem, by reducing the noise on the function we are taking the derivative, while preserving the most noticeable changes.

Consider the EPS algorithm applied to the signal $(y_i)_{i=1, \ldots, N}$. The only parameter to set is the length of the window, $n_w$. At each point i, consider the $n_w$ windows as shown by Eqn. (24).

$$\text{window}(i)_j = (y_{i-n_w+j}, \ldots, y_{i+j-1}), j=1, \ldots, n_w \tag{24}$$

The value EPS(i) is then chosen as the mean of the window which standard deviation is the smallest as shown by Eqn. (25).

$$EPS(i) = \frac{\sum_{l=i+k-n_w}^{i+k-1} y_l}{n} \text{ with } k = \operatorname{argmin}_j(std(\text{window}(i)_j)) \tag{25}$$

Figure 8A:
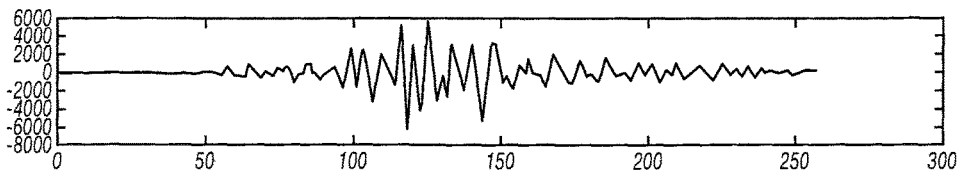
FIGS. 8A-8C are graphs illustrating an example recorded waveform and entropy function.
Figure 8B:
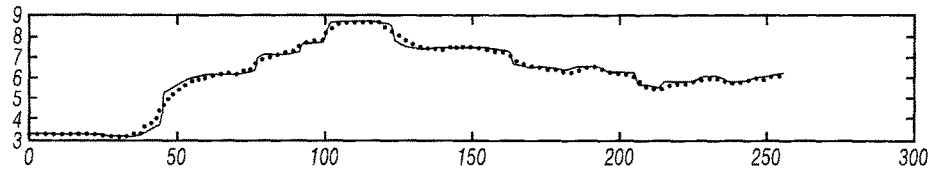
Figure 8C:
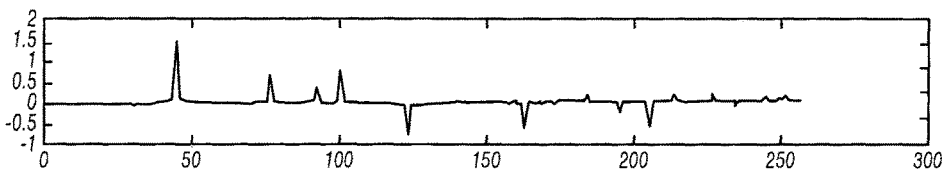

The result of the edge preserving smoothing procedure on the entropy function, together with its numerical derivative and the signal, is shown in FIGS. 8A-8C. FIGS. 8A-8C illustrate an example recorded waveform and entropy function. FIG. 8A is the recorded waveform. FIG. 8B is the entropy function. Additionally, the numerical derivative of the entropy function is shown in FIG. 8C. As shown in FIG. 8C, the resolution on the peak of the numerical derivative is well improved.

Example Application to Field Data

First-arrival time detection algorithms are applied on the signals recorded at an acoustic receiver array of a sonic tool such as the sonic tool described with regard to FIG. 1, for example. It is desirable to choose the most appropriate among the automated first-arrival time detection algorithms described above for application to the field data. As described above, the field data is obtained by LWD operations, and the drilling operations may badly affect the quality of the acoustic signals recorded, resulting in a very low SNR. After applying different algorithms on the waveforms recorded at various depth inside a borehole, it appeared that the algorithm providing the most robust first-break estimations was the entropy method. However, it should be understood that this disclosure should not be limited to using the entropy method and that other known first-arrival time detection methods can be used. This is not surprising since the amplitude of the noise is almost equal to the amplitude of the compressional waves, making methods based on ratio in energy within different types of windows extremely unreliable. On the other hand, the entropy method is more able to detect variations in the nature of the recorded signal, as its spectrum One of the difficulties shared by all the automated first-arrival time detection algorithms is to properly pick up the first break without mistaking with eventual later arrivals. Indeed, in borehole sonic logging, not only are P-arrivals recorded, but also S and Stoneley arrivals. Because S-waves and Stoneley waves are most of the time much stronger than P-waves, first-break algorithms may sometimes output these arrivals instead of the low amplitude P-wave onset. It is possible to reduce or eliminate this problem by dividing the energy ratio, or the entropy function and STA/LTA derivatives, by the energy of the signal within a window of size $2 \ldots n_e$ around each point. Actually, given the noisy field data, the best results were obtained by dividing by the power ¼ of the energy. Given for example the entropy function $(H_i)$, the first-arrival time estimations can be obtained as shown by Eqn. (26).

$$t = \operatorname{argmax}_i \frac{H_{i+1} - H_i}{\left|\sum_{j=i-n_e}^{i+n_e} x_j^2\right|^{1/4}} \tag{26}$$

Figure 9:
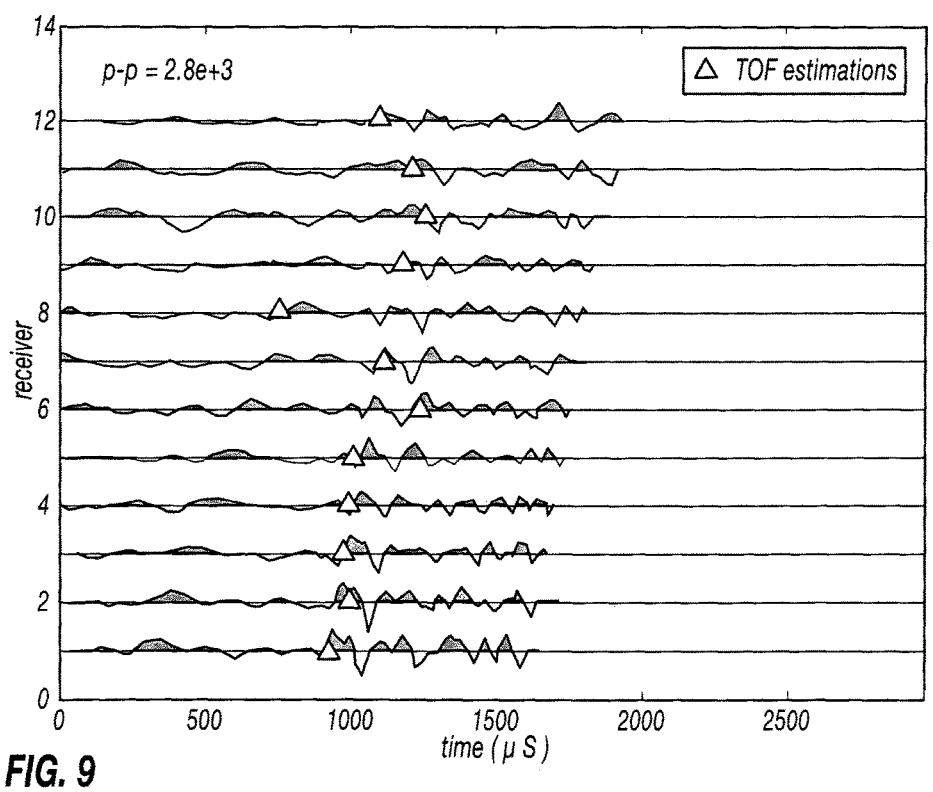
FIG. 9 is a graph illustrating TOF estimations of D&M data.

Among the numerous tests performed on the field data, the entropy method exhibits good ability in picking approximately the arrival times corresponding to the P-waves arrivals rather than some random high amplitude noise. Hence, using the entropy method algorithm is a first step toward more robust and accurate times of flight estimations. FIG. 9 is a graph illustrating TOF estimations of D&M data, for example, using a first-arrival time detection algorithm such as the entropy method. While some estimates seem to be reasonably good, some other estimates are obviously missing the P-wave arrivals.

Finding and Discarding Outliers

After estimating TOFs, the next step is to find and discard one or more of the TOF estimates that are missing P-wave arrivals, e.g., either detecting some noise before or missing it due to the low amplitude of compressional waves. At each depth, the sonic tool is composed of an array of equally-spaced acoustic receivers, for example, and hence the sonic tool is capable of recording a plurality of waveforms at each of the acoustic receivers. Since the spacing between each receiver is constant, it is expected that the time of flight of the P-wave between the acoustic source and each acoustic receiver should be linear with the index of the acoustic receiver, as long as the hypothesis that the borehole formation has a uniform P-wave velocity along the array length is approximately true. Given this a priori knowledge, the following steps can be taken in order to discard the time of flight estimates that have missed P-wave arrivals.

First, the first-break (first-arrival time, TOF, etc.) at each acoustic receiver can be calculated, for example, using the entropy method algorithm, where the numerical derivative of the entropy function is divided by the energy of the signal as expressed in Eqn. (26). Then, a least-square regression of the first break estimations as a function of the acoustic receiver index can be performed. This regression fits the best line to the entropy algorithm output.

Next, the standard deviation of the difference between the algorithm output and the linear regression can be calculated. For each acoustic receiver, i, if the absolute value of the difference between the estimated first break and the value of the least-squares regression in i is greater than the standard deviation, the corresponding first-arrival estimation is discarded. Then, a new linear regression is performed using the remaining (e.g., non-discarded) first-break estimations.

Next, the entropy algorithm is again performed, with two modifications. First, the entropy calculations are windowed within a window around the values given by the least-squares regression. The window must be small enough to avoid any later arrivals (e.g., S-wave and Stoneley arrivals). Additionally, the numerical derivative of the entropy is not divided by the energy since the risk of estimating a later high amplitude arrival has been reduced. Then, a new linear regression is performed on the results.

Next, the standard deviation of the difference between the new entropy algorithm output and the linear regression can be calculated. For each acoustic receiver, i, if the absolute value of the difference between the estimated first break and the value of the least-squares regression in i is greater than the standard deviation, the corresponding first-arrival estimation is discarded. Then, a new linear regression is performed using the remaining (e.g., non-discarded) first-break estimations. The final result is given either by the remaining values of the entropy method output, or by the linear regression for the waveforms for those TOF estimations were found to be irrelevant along the procedure.

Accordingly, using an outlier detection technique after having performed first-arrival time estimations, e.g., using any known first-arrival time detection algorithm, helps to improve the reliability of the results. By discarding outliers, it is possible to exclude some values which do not correspond to the P-wave arrivals. Then, additional techniques can be applied to the recorded data to achieve better accuracy on the first-arrival time estimations. As described in detail below, one technique is to estimate time delays between the signals recorded at two or more of the acoustic receivers. Since time delay estimation methods may be more robust to the presence of noise, it is possible to improve the accuracy on the times of flight estimations.

Time Delay Estimations

Let $x_1(t)$ and $x_2(t)$ be the measurement of a signal at two spatially separated sensors such as acoustic receivers, for example. Mathematically, these signals can be represented by Eqn. (27).

$$\begin{cases} x_1(t) = h_1(t) * s(t) + n_1(t), \\ x_2(t) = h_2(t) * s(t-D) + n_2(t), \end{cases} \quad (27)$$

where s(t) is a stationary unknown signal and $n_1(t)$ and $n_2(t)$ are stationary noises at each sensor. s(t) is assumed to be uncorrelated with $n_1(t)$ and $n_2(t)$, but no assumption is made on the correlation between $n_1(t)$ and $n_2(t)$. $h_1(t)$ and $h_2(t)$ represent the impulse response functions of the medium. D is the time delay between the signals at the two sensors. As described above, estimating the time delay D is the objective. Assuming that the medium properties are the same, which is generally the case for seismic and sonic data, Eqn. (27) can be simplified to Eqn. (28).

$$\begin{cases} x_1(t) = s(t) + n_1(t), \\ x_2(t) = s(t-D) + n_2(t), \end{cases} \quad (28)$$

Cross-Correlation and Generalized Cross-Correlation

An example technique in order to estimate the time delay D is to compute the cross-correlation function, for example, as defined by Eqn. (29).

$$R_{x_1 x_2}(\tau) = E(x_1(t)x_2(t+\tau)) \quad (29)$$

where E denotes the expectation. Since it is assumed that s, $n_1$, and $n_2$ are stationary, the cross-correlation function $R_{x_1 x_2}$ does not depend on the time t.

Practically, assuming that the processes $x_1$ and $x_2$ are ergodic, an expectation can be calculated by taking the time average along a single path as shown by Eqn. (30).

$$\hat{R}_{x_1 x_2}(\tau) = \frac{1}{T_2 - T_1} \int_{T_1}^{T_2} x_1(t) x_2(t+\tau) dt. \quad (30)$$

$\hat{R}_{x_1 x_2}$ is only an estimation of $R_{x_1 x_2}$ since the time average is realized over a finite time window on which the signals are considered stationary. In practice, signals which are defined for integer valued times t=0, . . . , N are dealt with, and the estimation of the cross-correlation function becomes, $$\hat{R}_{x_1 x_2}(\tau) = \frac{1}{N} \sum_{i=max(0;-\tau)}^{min(N,N-\tau)} x_1(i) x_2(i+\tau) \quad (31)$$

The cross-correlation function can also be calculated using Fourier analysis. Indeed, from the Wiener-Khintchine theorem, $$R_{x_1 x_2}(\tau) = E(x_1(t)x_2(t+\tau)) = \mathcal{F}^{-1}(P_{x_1 x_2}(w)) \quad (32)$$

where $P_{x_1 x_2}$ is the cross-spectrum, defined as, $$P_{x_1 x_2}(w) = E(X_1^*(w)X_2(w)), X_1(w) = \mathcal{F}(x_1), X_2(w) = \mathcal{F}(x_2), \quad (33)$$

with F the Fourier transform operator, $\mathcal{F}(f)(w) = \int_{-\infty}^{+\infty} f(t)e^{-iwt}dt$.

Using the signal model described in Eqn. (27), the cross-spectrum can be decomposed in order to see how it is affected by the different terms involved in Eqn. (27), $$P_{x_1 x_2}(\omega) = E(X_1^*(\omega)X_2(\omega)) = \underbrace{H_1^*(\omega)H_2(\omega)}_{media} \underbrace{P_{ss}(\omega)}_{source} \underbrace{e^{-i\omega D}}_{delay} + \underbrace{P_{n_1 n_2}(\omega)}_{noise} \quad (34)$$

It can be seen that the estimation of the time delay is colored by the propagation media, the source as well as the correlation of the noise. This latter term may lead to a biased estimation of the time delay, while the two first affect the resolution on the maximum of the cross-correlation function. The effect of the correlation of the noises can also be seen directly on the time domain in the case of identical impulse response functions (equation (29)), since, $$R_{x_1x_2}(\tau)=E(x_1(t)x_2(t+\tau))=R_{ss}(\tau-D)+R_{n_1n_2}(\tau), \quad (35)$$

where it can be seen that, although $R_{ss}(\tau-D)$ reaches its maximum in $\tau=D$, the last term $R_{n_1n_2}(\tau)$, which is generally unknown, may generate a different value of $\tau$ for the cross-correlation function to reach its maximum.

Improving the Resolution of the Maximum

In order to improve the accuracy on the peak of the cross-correlation function, it is desirable to first filter the signals $x_1(t)$ and $x_2(t)$ prior the integration, with some filtering function $G_1(w)$ and $G_2(w)$. The functions obtained after filtering, $y_1$ and $y_2$ lead to the calculation of the generalized cross-correlation function $R_{y_1y_2}$. As described above, $$R_{x_1x_2}(\tau)=\mathcal{F}^{-1}(E(X_1^*(w)X_2(w))), \quad (36)$$

and then it is possible to write the generalized cross-correlation function in terms of $G_1(w)$ and $G_2(w)$, $$R_{y_1y_2}(\tau)=\mathcal{F}^{-1}(E(G_1^*(w)X_1^*(w)G_2(w)X_2(w))). \quad (37)$$

The function, $$\Psi(w)=H_1^*(w)H_2(w); \quad (38)$$

denotes the general frequency weighting. Several frequency weightings are known in the art and a few are described in detail below. It should be understood that the frequency weightings described below are provided only as examples and that other known frequency weightings can be used with the techniques described herein.

The Smoothed Coherence Transform (SCOT)

The SCOT method uses the following weighting function, $$\Psi(\omega) = \frac{1}{\sqrt{P_{x_1x_1}(\omega)P_{x_2x_2}(\omega)}} \quad (39)$$

Hence, $$R_{y_1y_2}(\tau) = \mathcal{F}^{-1}\left(\frac{P_{x_1x_2}(\omega)}{\sqrt{P_{x_1x_1}(\omega)P_{x_2x_2}(\omega)}}\right). \quad (40)$$

The complex coherence function $\gamma_{x_1x_2}$, can be decomposed, $$\gamma_{x_1x_2}(\omega) = \frac{P_{x_1x_2}(\omega)}{\sqrt{P_{x_1x_1}(\omega)P_{x_2x_2}(\omega)}} \quad (41)$$

$$= \underbrace{\frac{H_1(\omega)/H_2(\omega)}{|H_1(\omega)/H_2(\omega)|}}_{media}\underbrace{\frac{U(\omega)e^{-i\omega D}}{SNR\ delay}} + \underbrace{\frac{P_{n_1n_2}(\omega)}{\sqrt{P_{x_1x_1}(\omega)P_{x_2x_2}(\omega)}}}_{noise}$$

where the function $U(w)$ depends on the signal-to-noise ratios $U_{x_1}(w)$ and $U_{x_2}(w)$, $$U(\omega) = \frac{1}{\sqrt{\left(1+\frac{1}{U_{x_1}(\omega)}\right)\left(1+\frac{1}{U_{x_2}(\omega)}\right)}}. \quad (42)$$

The inverse Fourier transform of the complex coherence function $\gamma_{x_1x_2}$, the generalized cross-correlation $R_{y_1y_2}$ is called the coherence correlation. There are few advantages using the latter rather than the conventional cross-correlation. First, the amplitude effects of the propagation media are normalized, and secondly $\gamma_{x_1x_2}$ depends on the signal-to-noise ratio rather than on the signal spectrum $P_{ss}$. When the noises become negligible, the function $U(w)$ tends to unity irrespective to the source spectrum. However, although normalized, the noise correlation term still affects the coherence correlation, leading to a biased estimate of the time delay when the noises $n_1$ and $n_2$ are correlated.

The Roth Processor

The general frequency weighting is now defined by, $$\Psi(\omega) = \frac{1}{P_{x_1x_1}(\omega)}. \quad (43)$$

The Phase Transform (PHAT)

The PHAT method uses the weighting, $$\Psi(\omega) = \frac{1}{|P_{x_1x_2}(\omega)|}. \quad (44)$$

The Eckart Filer

The Eckart method uses the weighting, $$\Psi(\omega) = \frac{P_{ss}(\omega)}{P_{n_1n_1}(\omega)P_{n_2n_2}(\omega)} \quad (45)$$

The HT Processor

The HT processor was shown to be a Maximum Likelihood estimator for the time delay.

$$\Psi(\omega) = \frac{1}{|P_{x_1x_2}(\omega)|}\frac{|\gamma_{12}(\omega)|^2}{(1-|\gamma_{12}(\omega)|^2)} \quad (46)$$

where, $$\gamma_{12}(\omega) = \frac{|P_{x_1x_2}(\omega)|^2}{P_{x_1x_1}(\omega)P_{x_2x_2}(\omega)}. \quad (47)$$

While all these weighting functions lead to a better resolution of the peak of the generalized cross-correlation function, it is not clear whether they make this peak less or more sensitive to noise.

Higher-order Statistics

An alternative approach in order to avoid a biased estimation of the time delay due to the correlation of the noises is to use higher order statistics. These, methods are based on the calculation of higher order cumulants. The definition of the joint cumulant function corresponding to a set of random variables $X_1, \ldots, X_n$ is shown by Eqn. (48), $$g(\xi_1, \ldots, \xi_n) = \log\left(E\left(\exp\left(\sum_{i=1}^n \xi_i x_i\right)\right)\right), \quad (48)$$

and its Taylor expansion, using Einstein's summation convention, $$g(\xi) = g(0) + D^i g(0)\xi_i + \frac{1}{2!}D^{ij}g(0)\xi_i\xi_j + \frac{1}{3!}D^{ijk}g(0)\xi_i\xi_j\xi_k + \ldots \quad (49)$$

The cumulants are then defined by the coefficients of the Taylor expansion, $$\begin{cases} c(X_i) = D^i g(0), \\ c(X_i, X_j) = D^{ij} g(0), \\ c(X_i, X_j, X_k) = D^{ijk} g(0), \\ \ldots \end{cases} \quad (50)$$

Calculating analytically the coefficients of the Taylor expansion provides, $$c(X_1, \ldots, X_k) = \sum_{\Pi}\left((|\Pi|-1)!(-1)^{|\Pi|-1}\prod_{S\in\Pi} E\left(\prod_{i\in S} X_i\right)\right), \quad (51)$$

where $\Pi$ describes all the possible partitions of the set $(1, \ldots, k)$, and $|\Pi|$ is the cardinal of $\Pi$.

Now, the cumulants functions of a stationary random process $(x(t))_{t\in R}$ are defined by, $$\begin{cases} c_1^x = c(x(t)), \\ c_2^x(\tau) = c(x(t), x(t+\tau)), \\ c_3^x(\tau_1, \tau_2) = c(x(t), x(t+\tau_1)x(t+\tau_2)), \\ \ldots \end{cases} \quad (52)$$

As shown by Eqn. (52), cumulants are linked to the moments of a random process. The n-th order moment of a stationary random process $x(t), k\in R$ is defined by, $$m_n^X(\tau_1, \tau_2, \ldots, \tau_{n-1}) = E(x(t)x(t+\tau_1)\ldots x(t+\tau_{n-1})). \quad (53)$$

For a zero-mean process, the following equations defining the cumulants of order 2, 3 and 4 are obtained.

$$c_2^x(\tau) = m_2^x(\tau)$$

$$c_3^x(\tau_1, \tau_2) = m_3^x(\tau_1, \tau_2)$$

$$\begin{aligned} c_4^x(\tau_1, \tau_2, \tau_3) = & m_4^x(\tau_1, \tau_2, \tau_3) - m_2^x(\tau_1)m_2^x(\tau_3-\tau_2) - \\ & m_2^x(\tau_2)m_2^x(\tau_3-\tau_1) - m_2^x(\tau_3)m_2^x(\tau_1-\tau_2) \end{aligned} \quad (54)$$

Going to the Fourier domain, the definitions of the power spectrum, the bispectrum, and the trispectrum are shown by Eqn. (55).

$$\hat{C}_2^x(\omega) = \sum_{\tau=-\infty}^{+\infty} c_2^x(\tau)e^{-i\omega\tau}, \quad (55)$$

$$\hat{C}_3^x(\omega_1, \omega_2) = \sum_{\tau_1=-\infty}^{+\infty}\sum_{\tau_2=-\infty}^{+\infty} c_3^x(\tau_1, \tau_2)e^{-i(\omega_1\tau_1+\omega_2\tau_2)},$$

$$\hat{C}_4^x(\omega_1, \omega_2, \omega_3) = \sum_{\tau_1=-\infty}^{+\infty}\sum_{\tau_2=-\infty}^{+\infty}\sum_{\tau_3=-\infty}^{+\infty} c_4^x(\tau_1, \tau_2, \tau_3)e^{-i(\omega_1\tau_1+\omega_2\tau_2+\omega_3\tau_3)}$$

The power spectrum, the bispectrum and the trispectrum can also be expressed in terms of the Fourier transform of the random process x, $X(w)=F(x)(w)$, $$\hat{C}_2^x(w) = E(X(w)X^*(w)),$$

$$\hat{C}_3^x(w_1, w_2) = E(X(w_1)X(w_2)X^*(w_1+w_2)),$$

$$\hat{C}_4^x(w_1, w_2, w_3) = E(X(w_1)X(w_2)X(w_3)X^*(w_1+w_2+w_3)). \quad (56)$$

An important function, the bicoherence, which is the normalized bispectrum, is defined by Eqn. (57).

$$Bc(\omega_1, \omega_2) = \frac{\hat{C}_3^x(\omega_1, \omega_2)}{\sqrt{\hat{C}_2^x(\omega_1)\hat{C}_2^x(\omega_2)\hat{C}_2^x(\omega_1+\omega_2)}}. \quad (57)$$

When dealing with two or three different random processes, useful functions are the cross-spectrum, the cross-bispectrum and the cross-bicoherence. Let x, y and z be three stationary random processes, these functions are defined (in the same order as mentioned) by Eqn. (58).

$$c_{xyz}(\tau_1, \tau_2) = c(x(k), y(k+\tau_1), z(k+\tau_2)), \quad (58)$$

$$\hat{C}_{xyz}(\omega_1, \omega_2) = \sum_{\tau_1=-\infty}^{+\infty}\sum_{\tau_2=-\infty}^{+\infty} c_{xyz}(\tau_1, \tau_2)e^{-i(\omega_1\tau_1+\omega_2\tau_2)},$$

$$Bc_{xyz}(\omega_1, \omega_2) = \frac{\hat{C}_{xyz}(\omega_1, \omega_2)}{\sqrt{\hat{C}_2^x(\omega_1)\hat{C}_2^y(\omega_2)\hat{C}_2^z(\omega_1+\omega_2)}}$$

The main advantage of using higher order statistics is that cumulants of order higher than 2 are equal to zero when the random process has a symmetric probability density function. Hence, dealing for example with the important case of Gaussian noise, the use of higher order statistics greater than 2 may allow to avoid the biased delay estimation due to the correlated noise.

Time delay estimation with third order bicoherence-correlation

It is possible to deal with the problem of time delay estimation between two signals $x_1$ and $x_2$. For example, it is possible to being with the definition of the cross-bicoherence, which is the normalized cross-bispectrum, as shown by Eqn. (59).

$$Bc_{xyz}(\omega_1, \omega_2) = \frac{\hat{C}_{xyz}(\omega_1, \omega_2)}{\sqrt{\hat{C}_2^x(\omega_1)\hat{C}_2^y(\omega_2)\hat{C}_2^z(\omega_1+\omega_2)}}, \quad (59)$$

The method for estimating the time delay using this function is known in the art. First, the bicoherence ratio $\Gamma_{x_1x_2x_1}(w_1, w_2)$, is evaluated as shown by Eqn. (60).

$$\Gamma_{x_1x_2x_1}(\omega_1, \omega_2) = \frac{Bc_{x_1x_2x_1}(\omega_1, \omega_2)}{Bc_{x_1x_1x_1}(\omega_1+\omega_2)}. \quad (60)$$

Then an integration is performed along the real axis in the second variable, as shown by Eqn. (61).

$$\Lambda_{x_1x_2}(w_1) = \int_{-\infty}^{+\infty}\Gamma_{x_1x_2x_1}(w_1, w_2)dw_2, \quad (61)$$

Then, the inverse Fourier transform is applied to obtain the bicoherence correlation $\tau_{x_1x_2}$, which is shown by Eqn. (62).

$$\tau_{x_1x_2}(\tau) = \mathcal{F}^{-1}(\Lambda_{x_1x_2}(w_1)). \quad (62)$$

The time delay estimation is then provided by the time at which the bicoherence correlation reaches its maximum, as shown by Eqn. (63).

$$\hat{D} = \text{argmax}_\tau \tau_{x_1x_2}(\tau) \quad (63)$$

As done previously for the cross-spectrum function and the complex coherence function, it is possible to decompose the bicoherence ratio, as shown by Eqn. (64).

$$\Gamma_{x_1 x_2 x_1}(\omega_1, \omega_2) = \underbrace{\frac{H_1(\omega_1)/H_2(\omega_1)}{|H_1(\omega_1)/H_2(\omega)|}}_{media} \underbrace{\frac{U(\omega_1)}{SNR}}_{} \underbrace{e^{-j\omega_1 D}}_{delay} \quad (64)$$

where, $$U(\omega_1) = \sqrt{\frac{1 + 1/U_{x_1}(\omega_1)}{1 + 1/U_{x_2}(\omega_1)}}, \quad (65)$$

As for the complex coherence function, the effect of the media are normalized. Moreover, if the two measurements are performed in similar noise environments, then $U(w_1) \approx 1$, and the resolution of the peak will be acceptable. Thus, using higher order statistics, the term corresponding to the correlation of the noises has vanished.

Parametric Bispectrum Method

Described below is another interesting method, which uses third order statistics but without the need to compute the bispectra.

From Eqn. (28), $$s(n-D) = x_1(n-D) - n_1(n-D), \quad (66)$$

and then, $$x_2(n) = x_1(n-D) - n_1(n-D) + n_2(n), \quad (67)$$

which can be written in a more general form.

$$x_2(n) = \sum_{i=-P}^{P} a_i x_1(n-i) - n_1(n-D) + n_2(n), \quad (68)$$

where P is an integer which is greater than D. Multiplying Eqn. (68) by $x_1(n)$ and $x_1(n+\varrho)$ and taking expectation, Eqns. (69) or (70) is obtained.

$$E(x_1(n)x_2(n+\tau)x_1(n+\rho)) = \Sigma_{i=-P}^{P} a_i E(x_1(n)x_1(n-i+\tau)x_1(n+\rho)) - E(x_1(n)n_1(n+\tau-D)x_1(n+\rho)) + E(x_1(n)n_2(n+\tau)x_1(n+\rho)), \quad (69)$$

or, $$R_{x_1 x_2 x_1}(\tau, \rho) = \sum_{i=-P}^{P} a_i R_{x_1 x_1 x_1}(\tau - i, \rho) - R_{x_1 n_1 x_1}(\tau - D, \rho) + R_{x_1 n_2 x_1}(\tau, \rho). \quad (70)$$

Assuming that the signals and the noises $n_1$ and $n_2$ are independent, and since the noises are Gaussian, the functions $R_{x_1 n_1 x_1}(\tau-D, \varrho)$ and $R_{x_1 n_2 x_1}(\tau, \varrho)$ are equal to 0. Hence, Eqn. (70) becomes, $$R_{x_1 x_2 x_1}(\tau, \rho) = \sum_{i=-P}^{P} a_i R_{x_1 x_1 x_1}(\tau - i, \rho). \quad (71)$$

Writing Eqn. (71) for several values of $\varrho$ and $\tau$, a linear over-determined system as shown by Eqn. (72) is obtained.

$$R_{x_1 x_2 x_1} = R_{x_1 x_1 x_1} \cdot A, \quad (72)$$

and the least squares solution of this linear system is, $$A = (R_{x_1 x_1 x_1}{}^T R_{x_1 x_1 x_1})^{-1} R_{x_1 x_1 x_1}{}^T R_{x_1 x_2 x_1}. \quad (73)$$

Then, the time delay D can be chosen as the value of i for which $|a_i|$ is maximum.

Time Delay Estimations Between N Signals

Now, N different signals, which are delayed versions of a source signal s plus an additive noise which is uncorrelated with s, are given by Eqn. (74).

$$\begin{cases} x_1(t) = s(t) + n_1(t), \\ x_2(t) = s(t - D_1) + n_2(t) \\ \vdots \\ x_N(t) = s(t - D_N - 1) + n_N(t), \end{cases} \quad (74)$$

The goal is to find the time delays between the signals $x_2, \ldots, x_N$ and the reference signal $x_1$. Accordingly, the goal is to find the time difference between the reference signal $x_1$ and at least two of the other signals. In other words, the goal is, to find the N−1 delays $(D_1, \ldots, D_{N-1})$.

Basic Technique

The most straightforward way to achieve this challenge is to estimate the delays between two consecutive signals using one of the techniques described above. Hence, as soon as the delays $d_1 = \text{delay}(x_1, x_2), \ldots, d_{N-1} = \text{delay}(x_{N-1}, x_N)$ are obtained, it is easy to deduce the values $(D_1, \ldots, D_{N-1})$. Indeed, trivially, $$D = \begin{pmatrix} 1 & 0 & \cdots & 1 \\ 1 & \ddots & \ddots & \vdots \\ \vdots & \ddots & \ddots & 0 \\ 1 & \cdots & 1 & 1 \end{pmatrix} d. \quad (75)$$

Beamforming

A different approach from the ones described above is to use a technique called beamforming. This technique includes applying a set of time shifts to the waveforms array then summing the waveforms. The time shifts which lead to the sum which has the highest $L^2$ norm provides an estimations of the times delays $(D_1, \ldots, D_{N-1})$. Indeed, the $L^2$ norm is maximum when the waveforms are aligned. Beamforming has been shown to be an optimum procedure when the noises which are added to the delayed source signal are white Gaussian.

Referring to $\{(\Delta \tau_0(\theta), \ldots, \Delta \tau_N(\theta)), \theta \in A, A \subset \mathbb{N}\}$ as the set of time shifts that apply to the waveforms array, with $\Delta \tau_1(\Theta) = 0$, then the desired value of $\Theta$ is obtained by Eqn. (76).

$$\hat{\theta} = \arg\max_{\theta} \sum_t |\sum_l x_l(t - \Delta \tau_l(\theta))|^2. \quad (76)$$

Then $(\hat{D}_1, \ldots, \hat{D}_N) = (\Delta \tau_2(\hat{\theta}), \ldots, \Delta \tau_N(\hat{\theta}))$, is obtained. By expanding the inner sum, it may be interpreted as varying the parameters 0 to shift and sum the cross-correlation between all possible pairs of waveforms, $$\hat{\theta} = \arg\max_{\theta} \sum_{l,j} r_{l,j}(\Delta \tau_l(\theta) - \Delta \tau_j(\theta)), \quad (77)$$

where $r_{l,j}$ is the cross-correlation between waveforms l and j, $$r_{i,j}(\tau) = \sum_t x_i(t) x_j(t+\tau), \quad (78)$$

There are two disadvantages to the beamforming technique. First, it is computationally expensive, since the set A in which the parameter $\Theta$ belongs to may be very large. For example, if, for each waveform, it is desired to try integer shifts varying in $[-K,K]$, then $\text{card}(A)=(K+1)^{N-1}$, which means that the program has $(K+1)^{N-1}$ $L^2$ norms to calculate. Secondly, this technique may lead to biased delay estimations when the noises are not white Gaussian.

Linear Regression

This technique consists in first calculating the delays between all the possible pairs of waveforms. Hence, for an array of N waveforms, $$\binom{N}{2}$$

delays are calculated. If $e_{ij}$ is the delay between the ith and jth waveforms, this delay is calculated by finding the maximum of the cross-correlation function, $$\hat{e}_{ij} = \arg\max_\tau r_{i,j}(\tau). \quad (79)$$

From this estimation of the pairwise delays $\hat{e}_{ij}$, an estimation of the parameters $\Delta\tau_l$ corresponding to the problem is desired, e.g., as shown by Eqn. (80).

$$x_l(t)=s(t-\Delta n)+n_l(t),\ l=1,\ldots,N. \quad (80)$$

As described above, $(D_{l-1}=\tau_l, (D_0 \equiv 0)$ was defined. The linear relationship between the parameters $e_{ij}$ and $\Delta\tau_l$ can be determined as shown by Eqn. (81).

$$\hat{e}_{ij}=\Delta\tau_j-\Delta\tau_i. \quad (81)$$

Writing the vector $e=(e_{12}, e_{13}, \ldots, e_{1N}, e_{23}, \ldots, e_{2N}, \ldots, e_{(N-1)N})$, and the vector $\Delta\tau=(\Delta\tau_1, \ldots, \Delta\tau_N)$, the following linear equation is obtained.

$$e=A\Delta\tau, \quad (82)$$

where, $$A \in \mathcal{M}_{\binom{N}{2},N}([0,1]), \quad (83)$$

$$A(ij,k) = \delta_{jk} - \delta_{ik}.$$

An estimation of vector $\Delta\tau$ is obtained by solving this over-determined system by the least squares method, $$\Delta\tau=(A^TA)^{-1}A^Te. \quad (84)$$

Linear regression is much faster than beamforming all the waveforms. However, an error on a delay estimation between a pair of waveforms will propagate, which leads to biased estimation of all the delays $(\Delta\tau_1, \ldots, \Delta\tau_N)$. Pairwise time delay estimation via maximization of the cross-correlation function is efficient when the noises are uncorrelated. Nevertheless, when noises appear to be correlated, it is better to use high order statistics, as described above. Hence, instead of calculating cross-correlations, the estimations $\hat{e}_{ij}$ are obtained by finding the maximum of the bicoherence-correlation function defined by Eqn. (85).

$$\hat{e}_{ij} = \arg\max_\tau \tau_{x_i x_j}(\tau). \quad (85)$$

Computing the bicoherence-correlation function is longer than computing the cross-correlation function, but it leads to better estimation of delays as long as the noises are symmetrically distributed.

Basic Technique Versus Linear Regression

The time delay estimations of a set containing N waveforms were considered as a random experiment. Hence, the error of each method was calculated by calculating the variance of the time delay estimations. Calling X the random variable which gives the result of a pairwise time delay estimator, without consideration of the method, it is possible to use either cross-correlation or bicoherence-correlation. Assume that the variance of X, Var(X), is independent of the true time delay which is equal to E(X).

The goal is to estimate the variance of each component of the time delays vector. $D=(D_1, \ldots, D_{N-1})$. The basic method uses the simple linear relationship, $$D = \begin{pmatrix} 1 & 0 & \cdots & 1 \\ 1 & \ddots & \ddots & \vdots \\ \vdots & \ddots & \ddots & 0 \\ 1 & \cdots & 1 & 1 \end{pmatrix} d \quad (86)$$

where, from the assumption, $\text{Var}(d_i)=\text{Var}(X), \forall i$. Hence, it is possible to calculate, $$\begin{aligned}\text{Var}(D_i) &= \text{Var}\left(\sum_{k=1}^i d_k\right) \\ &= \sum_{k=1}^i \text{Var}(d_k) \\ &= k \cdot \text{Var}(X).\end{aligned} \quad (87)$$

The above method may not be acceptable since the uncertainty on the time delays with respect to the reference waveform is proportional to the waveform index. Accordingly, for comparison, the variance of the vector D is calculated with the linear regression method described above.

$$\begin{aligned}\text{Var}(D) &= E((D-E(D))\cdot(D-E(D))^T) \\ &= E\big[((A^TA)^{-1}A^Te - E((A^TA)^{-1}A^Te))\cdot \\ &\quad ((A^TA)^{-1}A^Te - E((A^TA)^{-1}A^Te))^T\big] \\ &= E\big[(A^TA)^{-1}A^T\cdot(e-E(e))\cdot(e-E(e))^T\cdot((A^TA)^{-1}A^T)^T\big] \\ &= (A^TA)^{-1}A^TE((e-E(e))\cdot(e-E(e))^T)A((A^TA)^{-1})^T \\ &= (A^TA)^{-1}A^T\cdot\text{Var}(X)Id_{\binom{N}{2}}\cdot A((A^TA)^{-1})^T \\ &= \text{Var}(X)(A^TA)^{-1}A^TA((A^TA)^{-1})^T \\ &= \text{Var}(X)((A^TA)^{-1})^T.\end{aligned} \quad (88)$$

In order to calculate the variance of each component, $\text{Var}(D_k), k=1,\ldots,N-1$, the diagonal terms of the matrix $(A^TA)^{-1}$ are calculated. Careful calculation provides, $$((A^T A)^{-1})_{kk} = \frac{2}{N}, \quad (89)$$
$$k = 1, \ldots, N-1.$$

Hence, $$\text{Var}(D_k) = \text{Var}(D)_{kk} = \frac{2}{N}\text{Var}(X). \quad (90)$$

With the linear regression method, the uncertainty on each component of D is independent of the waveform number k. Additionally, this uncertainty is much smaller as compared to the basic method. Thus, the linear regression method can optionally be preferred when trying to estimates the N−1 delays relative to the first waveform.

Hybrid Regression-Beamforming

As described above, the linear regression method is computationally faster than beamforming all the waveforms. However, any biased estimations in the pairwise correlations may propagate leading to biased estimations of the delays $\Delta\tau$. In order to get better robustness with results which are less sensitive to such errors at the first step of the algorithm, it may be desirable to use more time delay estimations between waveforms before inverting the over-determined system. Thus, instead of considering the time delays between all pairs of waveforms, the delays of all subset of waveforms of size P can be calculated. To calculate the delays of each of the $$\binom{N}{P}$$

subsets of waveforms, the beamforming technique described above can be used. Accordingly, this method is referred to as "Hybrid regression-beamforming".

Let $k \in (1, \ldots, NP)$, beamforming each subset of size P provides us the delays $\Delta\tau_p = \{(\Delta\tau_1^{(k)}, \ldots, (\Delta\tau_P^{(k)}), k \in [[1, NP]]\}$, and then, an over-determined system can be solved where the matrix $A_P$ has known entries, $$\Delta\tau_P = A_P \Delta\tau, \quad (91)$$
$$A_P \in M_{\binom{N}{P},P,N}([0,1]),$$

$$\Delta\tau = (A_P^T A_P)^{-1} A_P^T \Delta\tau_P. \quad (92)$$

The larger the subsets are, the more robust is the method, while increasing the computational complexity. Hence, a hierarchy of algorithms is possible. A way to achieve a proper time delay estimation is then to start with the simplest procedure, the linear regression with cross-correlation calculations, and evaluate the model error.

Performance Analysis Using Synthetic Data

In order to analyze the performance of the different techniques described above, Monte-Carlo simulations were performed on synthetic data. For each run, the uncorrupted delayed signal at eight acoustic receivers remains constant, while the noise is generated randomly, but always with the same correlation properties.

The Uncorrupted Waveform

First, an array of 8 identical waveforms (e.g., waveforms N=1, 2 ... 8) was created, where each of the waveforms was composed of 256 samples. The reference waveform is a Ricker wavelet convolved with a FIR filter. The Ricker wavelet is defined by, $$r(t) = (1 - 2(\pi f t)^2) e^{(-\pi f t)^2}. \quad (93)$$

Figure 10:
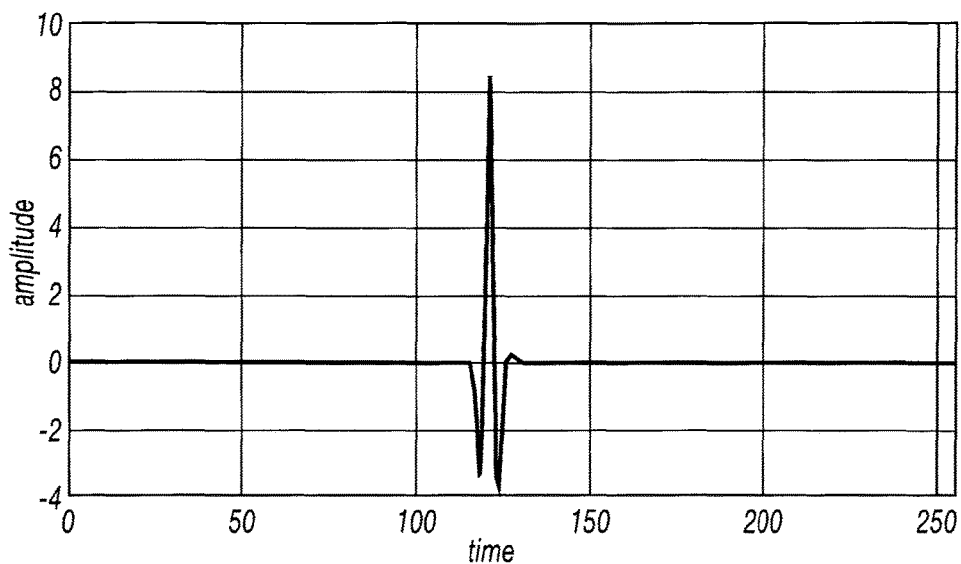
FIG. 10 is a graph illustrating the uncorrupted waveform.

FIG. 10 is a graph illustrating the uncorrupted waveform. Then, the waveforms, e.g., waveforms i=2, ..., 8 were shifted with delays $D_i = (i-1) \cdot 5$ relative to the first waveform, e.g., waveform i=1.

Generation of Spatially and Temporally Correlated Noise

N stationary noises $(n_1, \ldots, n_N)$ are then generated in order to add them to the initial waveform described above. The computation is performed as follows.

First, the two following vectors were created, $$a = (1, -0.7, 0.4, 0.1), \quad (94)$$

$$b = (b_1, b_2, b_3, b_4, b_5), \quad (95)$$

where the elements $b_i$ are random variables, independent and Gaussian with zero mean and unity variance. The correlated noise is then generated via an auto-regressive-moving-average ("ARMA") process, $$a_1 v^{(1)}(n) + a_2 v^{(1)}(n-1) + a_3 v^{(1)}(n-2) + a_4 v^{(1)}(n-3) = b_1 s^{(1)}(n) + b_2 s^{(1)}(n-1) + b_3 s^{(1)}(n-2) + b_4 s^{(1)}(n-3) + b_5 s^{(1)}(n-4), \quad (96)$$

where the process $(s(n))_{n \in \mathbb{N}}$ is a white Gaussian noise. It is clear that the process v est zero-mean since there is no deterministic component on the right hand side of the equation. Moreover, the roots of the polynomial $P(X) = a_1 + a_2 X + a_3 X^2 + a_4 X^3$ are $(r_1, r_2, r_3) \approx (-5.6, 0.8+1.1i, 0.8-1.1i)$ which the modulus are all strictly bigger than 1, $|r_i| > 1$. It follows that the process v is stationary.

Then, a set of three other identical ARMA processes using vectors are generated, $$c = (1, -1.75, 1.4, -0.6), \quad (97)$$

$$d = (d_1, \ldots, d_{10}), \quad (98)$$

where the elements $d_i$ are random variables, independent and Gaussian with zero mean and unity variance.

$$\begin{cases} c_1 \eta_1^{(1)}(n) + \ldots + c_4 \eta_1^{(1)}(n-3) = d_1 s_1(n) + \ldots + d_{10} s_1(n-9), \\ c_1 \eta_2^{(1)}(n) + \ldots + c_4 \eta_2^{(1)}(n-3) = d_1 s_2(n) + \ldots + d_{10} s_2(n-9), \\ c_1 \eta_3^{(1)}(n) + \ldots + c_4 \eta_3^{(1)}(n-3) = d_1 s_3(n) + \ldots + d_{10} s_3(n-9), \end{cases} \quad (99)$$

where $s_1$, $s_2$ and $s_3$ are independent white Gaussian noises. Again, the processes $\eta_1^{(1)}$, $\eta_2^{(1)}$, and $n_3^{(1)}$ are clearly zero-mean. Moreover, the roots of the polynomial $P(X) = c_1 + c_2 X + c_3 X^2 + c_4 X^3$ are $(r_1, r_2, r_3) \approx (1.1, 0.6+1.1i, 0.6-1.1i)$ which modulus are all strictly bigger than 1, $|r_i| > 1$. It follows that these processes are stationary. Finally, the first noise process is obtained by Eqn. ('100).

$$n_1(n) = \frac{1}{3}(\eta_1^{(1)}(n) + \eta_2^{(1)}(n) + \eta_3^{(1)}(n)) + v^{(1)}(n). \quad (100)$$

A linear combination of stationary processes is also stationary, which means that $n_1$ is stationary.

To get the other noises $n_l$, $l = 2, \ldots, N$ by calculating $v^{(l)}$, $$a_1 v^{(l)}(n) + a_2 v^{(l)}(n-1) + a_3 v^{(l)}(n-2) + a_4 v^{(l)}(n-3) = b_1 s^{(l)}(n) + b_2 s^{(l)}(n-1) + b_3 s^{(l)}(n-2) + b_4 s^{(l)}(n-3) + b_5 s^{(l)}(n-4), \quad (101)$$

and $\eta_1^{(l)}$, $\eta_2^{(l)}$, $\eta_3^{(l)}$ from $\eta_1^{(l-1)}$, $\eta_2^{(l-1)}$, $\eta_3^{(l-1)}$ $$\begin{cases} 0.9\eta_1^{(l)}(n-3) = \eta_1^{(l-1)}(n), \\ 0.6\eta_2^{(l)}(n-6) = \eta_2^{(l-1)}(n), \\ 0.2\eta_3^{(l)}(n-11) = \eta_3^{(l-1)}(n), \end{cases} \quad (102)$$

then, $n_l$ is calculated from, $$n_l(n) = \frac{1}{3}\left(\eta_1^{(l)}(n) + \eta_2^{(l)}(n) + \eta_3^{(l)}(n)\right) + v^{(l)}(n). \quad (103)$$

Figure 11:
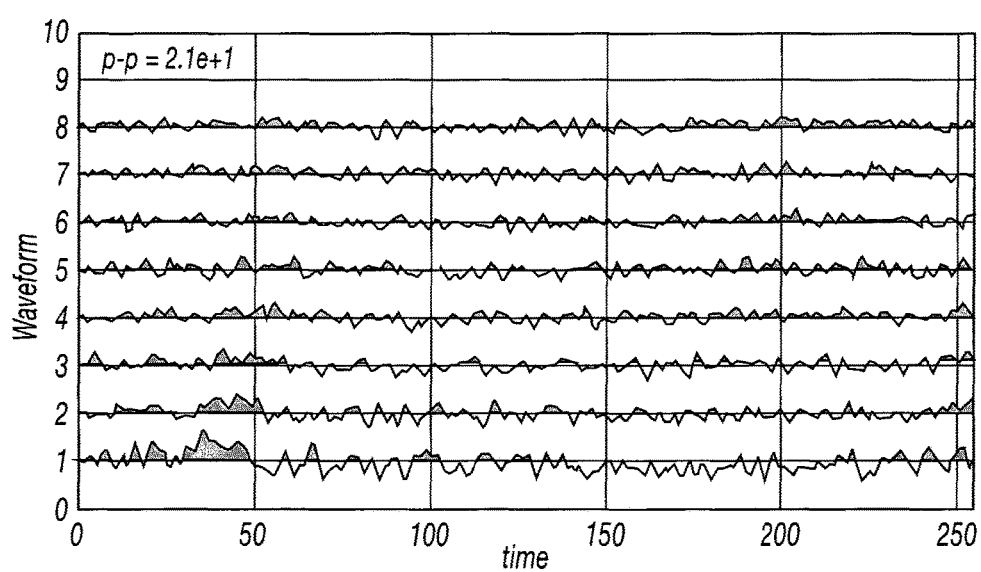
FIG. 11 is a graph illustrating an example of the spatially and temporally correlated noises

Again, it is clear that all the processes $n_l$, $l=2, \ldots, N$ are all stationary. FIG. 11 is a graph illustrating an example of the spatially and temporally correlated noises $n_1, \ldots, n_l$.

Results

Figure 12:
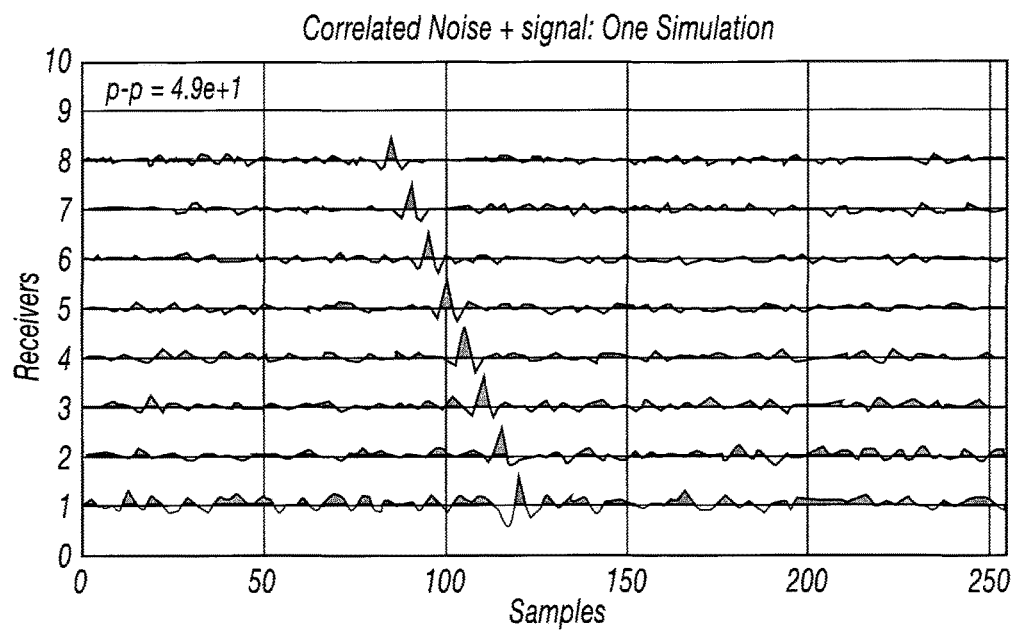
FIG. 12 is a graph illustrating the uncorrupted waveforms (N=1, 2, . . . 8) with the respective stationary noises ($n_1$, . . . , $n_N$) added thereto.

FIG. 12 is a graph illustrating the uncorrupted waveforms (N=1, 2, ... 8) with the respective stationary noises $(n_1, \ldots, n_N)$ added thereto. The time delays were then calculated with the following techniques, 1. Basic method using cross-correlations (i.e., "correlation" in FIGS. 13-18),
2. Basic method using bicoherence correlation (i.e., "bicoherence" in FIGS. 13-18),
3. Linear regression with cross-correlation (i.e., "linear with correlation" in FIGS. 13-18),
4. Linear regression with bicoherence(i.e., "linear with bicoherence" in FIGS. 13-18),
5. Hybrid regression-beamforming with P=2 (i.e., "linear with beamforming" in FIGS. 13-18).

Figure 13:
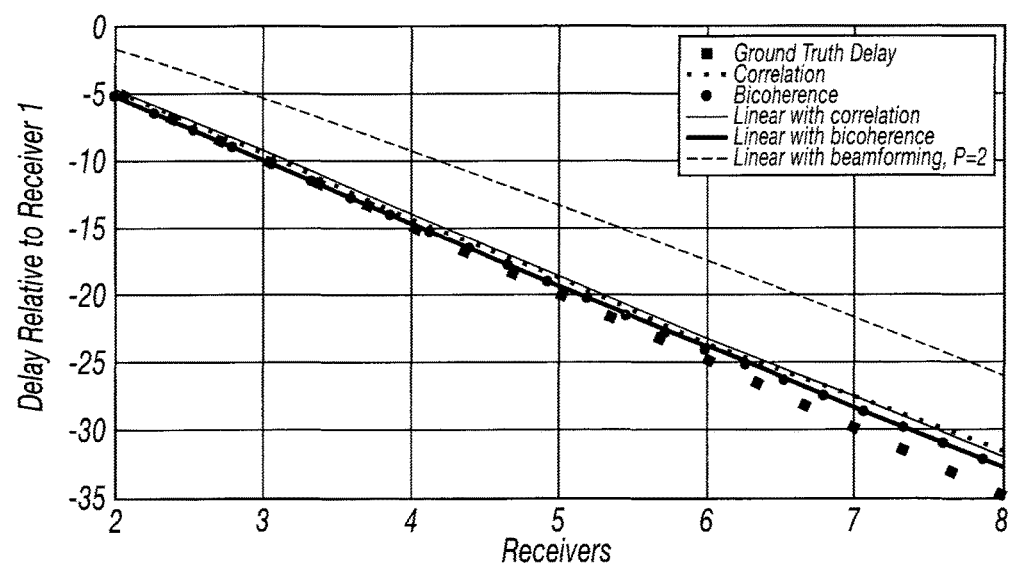
FIG. 13 is a graph illustrating the mean time delays relative to the first waveform (i.e., waveform N=1) for SNR=9 dB.
Figure 14:
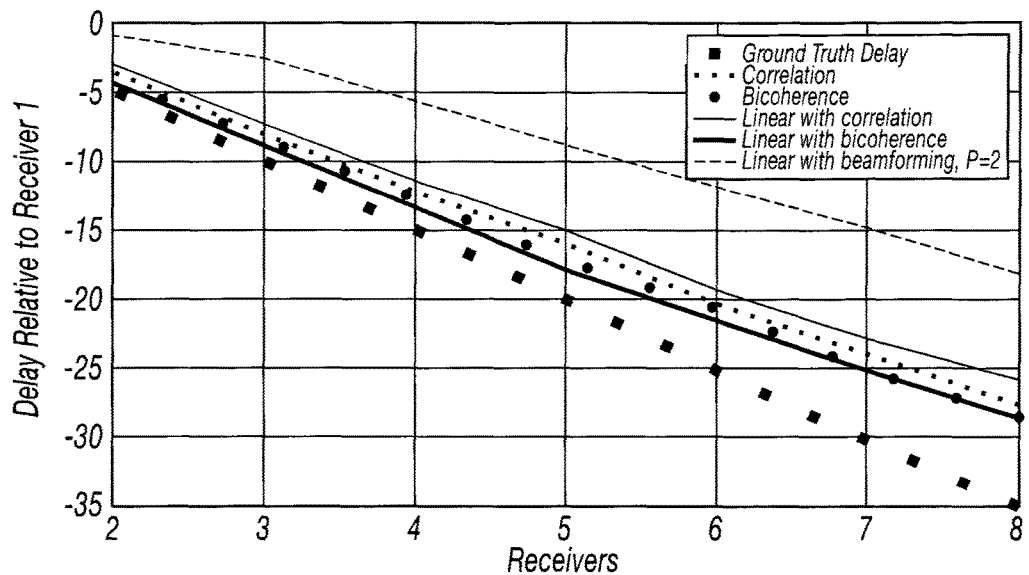
FIG. 14 is a graph illustrating the mean time delays relative to the first waveform (i.e., waveform N=1) for SNR=7 dB.
Figure 15:
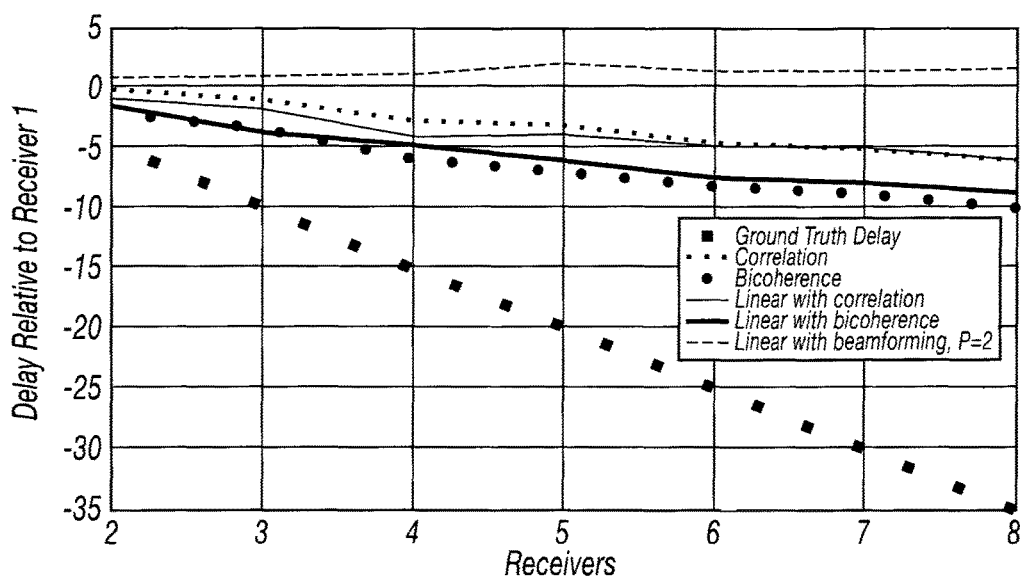
FIG. 15 is a graph illustrating the mean time delays relative to the first waveform (i.e., waveform N=1) for SNR=3 dB.

In particular, 500 Monte-Carlo simulations were run in order to calculate the mean and the standard deviation of the time delays estimations. The experiments were performed for SNR=3, 7 and 9 dB. FIG. 13 is a graph illustrating the mean time delays relative to the first waveform (i.e., waveform N=1) for SNR=9 dB. FIG. 14 is a graph illustrating the mean time delays relative to the first waveform (i.e., waveform N=1) for SNR=7 dB. FIG. 15 is a graph illustrating the mean time delays relative to the first waveform (i.e., waveform N=1) for SNR=3 dB.

In the case SNR=9 dB, very acceptable time delays estimations were obtained using techniques 1 to 4 above. As shown in FIG. 13, only technique 5, i.e., using hybrid-regression beamforming as an estimator of the $$\binom{N}{2}$$

pairwise delays failed to provide consistent results. The reason is due to the spatial correlation of the noises which entails that the $L^2$ norms calculated in Eqn. (76) do not reach their maximum when the waveforms are shifted by their exact time delays. In the case SNR=7 dB, acceptable results are also obtained, as the relative error for techniques 1 to 4 remain below 0.3. Again, similar to FIG. 13, the hybrid-regression beamforming technique generates wrong time delays estimations as shown in FIG. 14. As shown in FIG. 15, in the case SNR=3 dB, which means that the signal is completely covered by the noise (i.e., the amplitude of the original Ricker signal is nearly equal to the variance of the noise), the limits of the above techniques can be observed in highly noisy environments, since none of the techniques provides consistent time delays estimations.

Moreover, the techniques using higher order statistics (e.g., basic with bicoherence (technique 2 above) and linear regression with bicoherence (technique 4 above)) perform better than techniques using cross-correlation (basic with cross-correlation (technique 1 above) and linear regression with cross-correlation (technique 3 above)), as it was expected from the theoretical studies which showed that cross-correlations based techniques are sensitive to the spatially correlated noises, while high order statistics based techniques are not.

Figure 16:
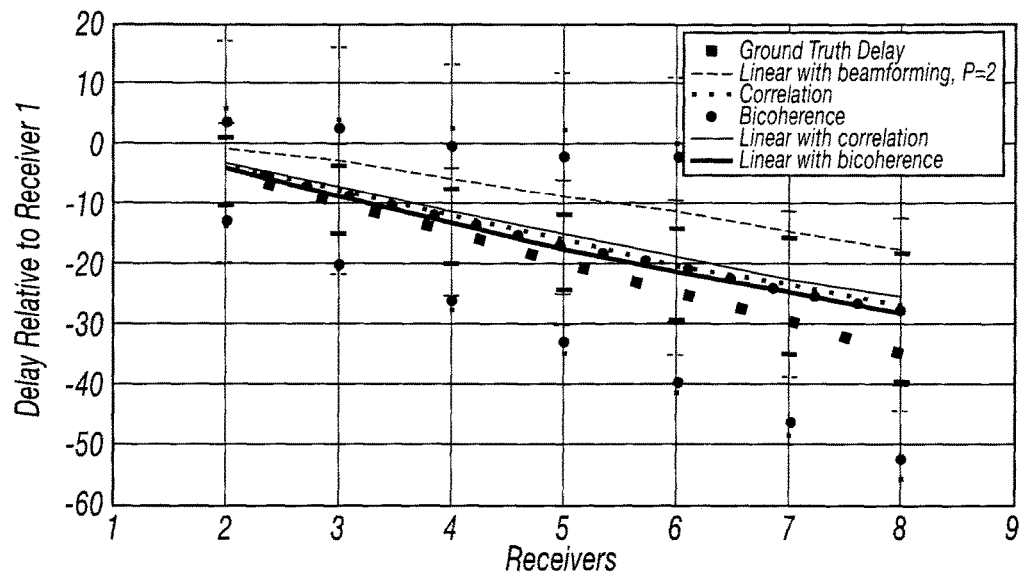
FIG. 16 is a graph illustrating the mean time delays relative to the first waveform (i.e., waveform N=1) for SNR=7 dB with standard deviation error bars.

From the plots of the mean time delays estimations, it is not clear whether the techniques using linear regression perform better than basic methods which just add the pairwise delays between two adjacent waveforms. Indeed the means of linear regressions are approximately equals to the means of basic methods. To investigate deeper the performance of each method, the standard deviation of the results obtained with the different techniques can be plotted. For example, FIG. 16 is a graph illustrating the mean time delays relative to the first waveform (i.e., waveform N=1) for SNR=7 dB with standard deviation error bars. As shown in FIG. 16, the results obtained with the linear regression methods (techniques 3 and 4) are less spread and more confined around their mean value than the results obtained by their corresponding basic methods (techniques 1 and 2). In fact, the variance grows with the number of the waveforms for both the basic methods (cross-correlation and bicoherence). Besides, it can be seen that the variance of each time delay using the linear regression techniques also seems to grow with the waveform number, but much more slowly. Although this variance should be constant, this result is due to the fact that the noise of the last waveforms are more correlated than the noises of the first waveforms. Optionally, based on the above experiments, the preferred technique when aiming at getting the most accurate results is the linear regression with bicoherence technique (technique 4 above).

In order to improve the accuracy of the results, it is desirable to reduce the size of the part of the signal on which the above techniques are applied. Once the window size and position are made, the values of the waveforms which are outside the window can be set to zero or flag value.

Figure 17:
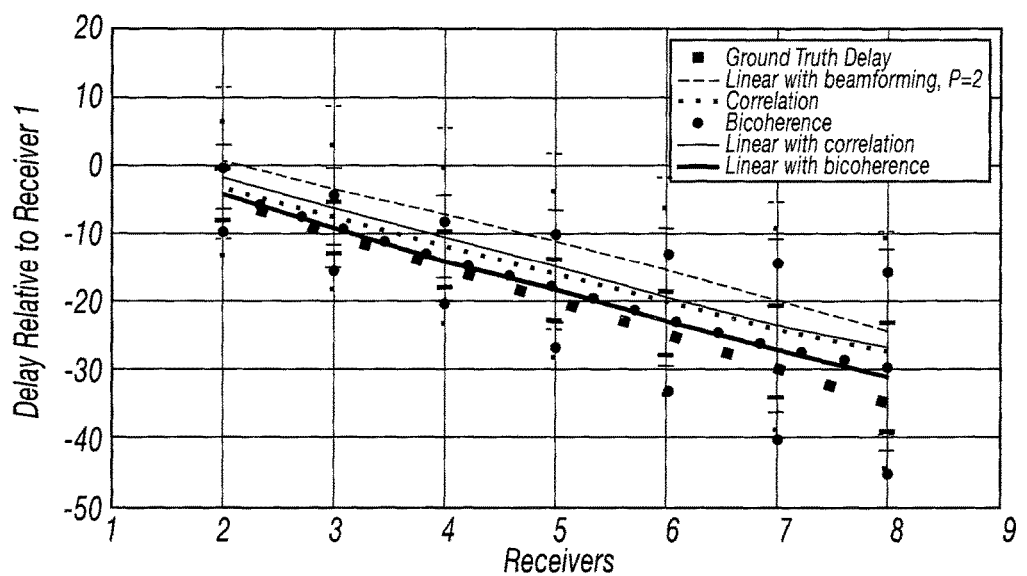
FIG. 17 is a graph illustrating the mean time delays relative to the first waveform (i.e., waveform N=1) for SNR=7 dB for a window=[50:150].
Figure 18:
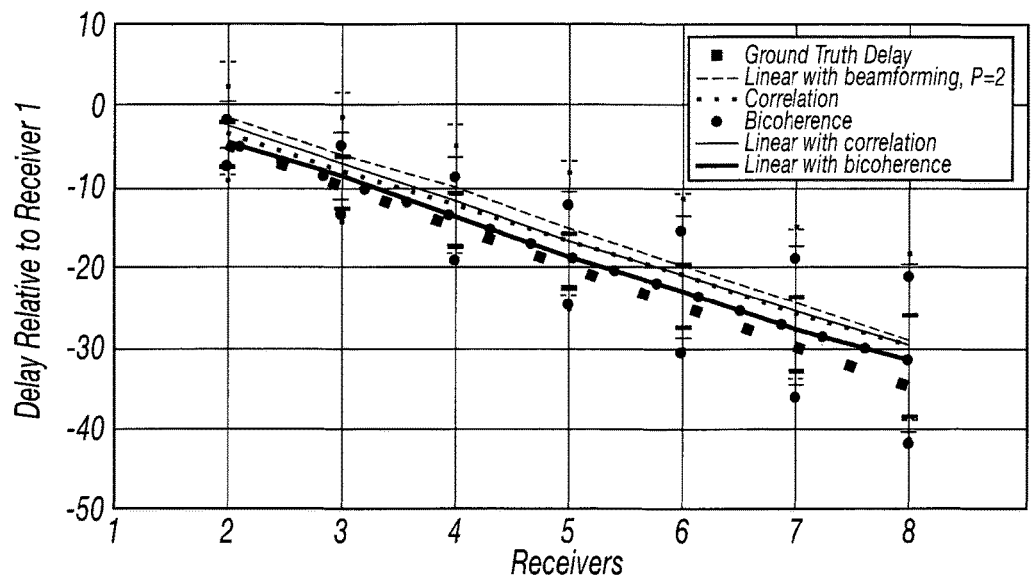
FIG. 18 is a graph illustrating the mean time delays relative to the first waveform (i.e., waveform N=1) for SNR=7 dB for a window=[70:135].

Accordingly, the data of the waveforms which are outside the window can be disregarded, ignored, or otherwise not considered in the calculations. For example, FIG. 17 is a graph illustrating the mean time delays relative to the first waveform (i.e., waveform N=1) for SNR=7 dB for a window=[50:150]. FIG. 18 is a graph illustrating the mean time delays relative to the first waveform (i.e., waveform N=1) for SNR=7 dB for a window=[70:135]. As expected, the shorter the time window is, the more accurate the estimations are. Further, in the case of the shortest time window, even the hybrid linear beamforming technique (technique 5 above) manages to provide consistent results.

Delays Between P-waves

The following description focuses on the waveforms recorded during borehole sonic logging as opposed to synthetic data. As described above, each acoustic receiver in an array may highlight several arrivals. In a fast formation, it may be possible to distinguish most of the time P-wave, S-wave, and Stoneley wave arrivals. Since different types of waves have different speeds in the formation, they all have different delays at the acoustic receivers. However, the time delay techniques described herein are only capable to estimate a single delay between two respective waveforms. It is therefore desirable to find some time windows where the signal at each receiver is mainly composed of a single type of wave. The automated arrival-time detection algorithms described above provide an approximate P-wave arrival times. Hence, choosing a time window around P-wave arrival times ensures that the waveform within that window corresponds to the P-waves. Practically, the time length of the entire waveform can be preterved, but data outside the window is set to zero or a flag value, similar as discussed above. Once the waveform at each acoustic receiver is properly windowed, it is possible to apply any of the techniques providing time delay estimations between N signals. As described above, the linear regression with bicoherence-correlation is optionally preferred due to its better accuracy in presence of correlated noise.

Improving TOF Estimations Using Time Delays

Time delays and times of flight are linked by the fact that the delay between P-waves at two receivers is equal to the difference of the first-arrival times at these receivers. Hence, this link can help us in improving the accuracy on times of flight estimations, all the more that time delay estimations are more robust to noise than any arrival-time detection technique.

As used herein, $TOF=(TOF_1, \ldots, TOF_N)$ are the true times of flight at acoustic receivers $1, \ldots, N$, and $T\hat{O}OF=(T\hat{O}F_1, \ldots, T\hat{O}F_N)$ are the times of flight (TOF) calculated by the first-arrival time detection algorithms described above. Also, $D=(D_1, \ldots, D_{N-1})$ are the actual time delays between the reference signal (or waveform) at acoustic receiver 1 and the signals (or waveforms) recorded at the receivers $i=2, N$, and $\hat{D}=(\hat{D}_1, \ldots, \hat{D}_{N-1})$ are the time delays calculated using the beamforming algorithm described above. Thus, $D_i=TOF_{i+1}-TOF_1$, $i=1, \ldots, N-1$, which can be written in a matricial form, $$D = \underline{A} \cdot TOF. \quad (104)$$

The estimated times of flight $T\hat{O}F$ and delays $\hat{D}$ verify the following equations, $$\begin{cases} \hat{D} = \underline{A} \cdot TOF + \xi_1 \\ T\hat{O}F = TOF + \xi_2 \end{cases}, \quad (105)$$

where $\xi_1$ and $\xi_2$ are the errors on the algorithm estimations. As previously encountered when estimating N delays from all the possible pairwise delays, an over-determined system is encountered, e.g., with more equations than unknowns. The difference is that the accuracy on each equation is not uniform since time delay methods are more accurate than first-arrival time detection algorithms. This over-determined system can be solved by finding the most probable solution given some distribution on the error terms.

The joint a posteriori probability distribution of the times of flight TOF, knowing the algorithms outputs $T\hat{O}F$ and $\hat{D}$, is given by, $$P(TOF|T\hat{O}F, \hat{D}) = \frac{P(\hat{D}|TOF, T\hat{O}F)P(TOF|T\hat{O}F)}{P(\hat{D}|T\hat{O}F)} \quad (106)$$

Since the function $P(\hat{D}(D|TOF)$ is independent of TOF, $$P(TOF|T\hat{O}F, \hat{D}) \propto P(\hat{D}|TOF, T\hat{O}F)P(TOF|T\hat{O}F). \quad (107)$$

Assuming that the error $\xi_1$ is a vector of $N-1$ independent identically distributed Gaussian random variables, with zero mean and variance $\sigma_1$, it is possible to calculate the first term of the product in the right hand side of Eqn. (107) as shown by Eqn. (108).

$$P(\hat{D}|TOF, T\hat{O}F) = P(\hat{D}|TOF) \quad (108)$$
$$= \frac{1}{(2\pi)^{(N-1)/2}\sigma_1^{N-1}} \exp\left(-\frac{\|\hat{D} - \underline{A} \cdot TOF\|^2}{2\sigma_1^{2(N-1)}}\right)$$
$$= \frac{1}{(2\pi)^{(N-1)/2}\sigma_1^{N-1}} \exp\left(\frac{1}{\sigma_1^{2(N-1)}} \sum_{i=1}^{N-1} (\hat{D}_i - TOF_{i+1} + TOF_1)^2\right)$$

Making the same assumption for the error $\xi_2$, i.e. it is a vector of independent identically distributed Gaussian random variables, with zero mean and variance $\sigma_2$, it is possible to calculate the second term of the product as shown by Eqn. (109).

$$P(TOF|T\hat{O}F) = \frac{1}{(2\pi)^{N/2}\sigma_2^N} \exp\left(-\frac{\|TOF - T\hat{O}F\|^2}{2\sigma_2^{2N}}\right) \quad (109)$$
$$= \frac{1}{(2\pi)^{N/2}\sigma_2^N} \exp\left(-\frac{1}{2\sigma_2^{2N}} \sum_{i=1}^{N} (TOF_i - T\hat{O}F_i)^2\right).$$

Then, maximizing the function as shown by Eqn. (110)

$$f(TOF) = P(\hat{D}|TOF, T\hat{O}F)P(TOF|T\hat{O}F) \quad (110)$$
$$= \frac{1}{(2\pi)^{(N-1)/2}\sigma_2^{N-1}} \frac{1}{(2\pi)^{N/2}\sigma_2^N} \exp\left(-\frac{\|\hat{D} - \underline{A} \cdot TOF\|^2}{2\sigma_1^{2(N-1)}} - \frac{\|TOF - T\hat{O}F\|^2}{2\sigma_2^{2N}}\right)$$

will provide the best estimation of the times of flight TOF, given the output of both the first arrival time-detection algorithm and the time delay algorithm. Finding the maximum of f is equivalent to find the minimum of, $$h(TOF) = \frac{\|\hat{D} - \underline{A} \cdot TOF\|^2}{2\sigma_1^{2(N-1)}} + \frac{\|TOF - T\hat{O}F\|^2}{2\sigma_2^{2N}}. \quad (111)$$

The optimal times of flight TOF must satisfy the first derivative necessary condition of local minimum, $$\frac{\partial h}{\partial TOF_i}(T\tilde{O}F) = 0, \quad i = 1, \ldots, N, \quad (112)$$

which is, $$\begin{cases} \frac{\partial h}{\partial TOF_1}(T\tilde{O}F) = \frac{1}{\sigma_1^{2(N-1)}} \sum_{i=1}^{N-1} (\hat{D}_i - T\tilde{O}F_{i+1} + T\tilde{O}F_1) + \\ \quad \frac{1}{\sigma_2^{2N}} (T\tilde{O}F_1 - T\hat{O}F_1) = 0 \\ \frac{\partial h}{\partial TOF_i}(T\tilde{O}F) = \frac{1}{\sigma_1^{2(N-1)}} (T\tilde{O}F_i - \hat{D}_{i-1} - T\tilde{O}F_1) + \\ \quad \frac{1}{\sigma_2^{2N}} (T\tilde{O}F_i - T\hat{O}F_i) = 0, \quad i = 2, \ldots, N. \end{cases} \quad (113)$$

This is a linear system which can be solved analytically, $$\begin{cases} T\tilde{O}F_1 = \dfrac{1}{\sigma_1^{2(n-1)} + N\sigma_2^{2N}}\left((\sigma_1^{2(n-1)} + \sigma_2^{2N})T\hat{O}F_1 + \sigma_2^{2N}\sum_{i=1}^{N-1}(T\hat{O}F_{i+1} - \hat{D}_i)\right), \\ T\tilde{O}F_i = \dfrac{1}{\sigma_1^{2(n-1)} + \sigma_2^{2N}}(\sigma_2^{2N}(T\tilde{O}F_1 + \hat{D}_{i-1}) + \sigma_2^{2(N-1)}T\hat{O}F_i), \\ i = 2, \ldots, N. \end{cases} \quad (114)$$

Hence, the solution to the first derivative necessary conditions is unique, providing a unique candidate as a global minimum. Since the function h is coercive, it is possible to deduce that this is indeed the global minimum. The two unknown parameters $\sigma_1$ and $\sigma_2$ can be assessed by evaluating the variance of the results of the first arrival time-detection and time delay algorithms on a sufficiently large set of field data.

From the tests, it appeared that the time delay algorithm is much more robust than the first-break algorithm. Hence, in order to highlight the improvement on times of flight estimations thanks to the time delays, it is possible to consider the simpler problem where $\hat{D}=D$, $$\begin{cases} \hat{D} = A \cdot TOF \\ T\hat{O}F = TOF + \xi \end{cases} \quad (115)$$

where $\xi$ is a vector of independent identically distributed Gaussian variables with zero mean and variance $\sigma$. It is desirable to maximize, $$P(TOF|T\hat{O}F) = \dfrac{1}{(2\pi)^{N/2}\sigma^N}\exp\left(-\dfrac{\|TOF - T\hat{O}F\|^2}{2\sigma_2^{2N}}\right) \quad (116)$$

under the constraint $\hat{D}_i = TOF_{i+1} - TOF_1, \ldots, i=1, \ldots, N-1$. Substituting the constraint in Eqn. (116), Eqn. (117) is obtained.

$$P(TOF|T\hat{O}F, \hat{D}) = \dfrac{1}{(2\pi)^{N/2}\sigma^N}\exp\left(-\dfrac{1}{2\sigma^{2N}}\left((TOF_1 - T\hat{O}F_1)^2 + \sum_{i=2}^{N}(\hat{D}_{i-1} + TOF_1 - T\hat{O}F_i)^2\right)\right) \quad (117)$$

$$P(TOF|T\tilde{O}F, D) = \dfrac{1}{(2\pi)^{N/2}\sigma^N}\exp\left(-\dfrac{1}{2\sigma^{2N}}\left((TOF_1 - T\tilde{O}F_1)^2 + \sum_{i=2}^{N}(D_{i-1} + TOF_1 - T\tilde{O}F_i)^2\right)\right).$$

Maximizing $P(TOF|T\tilde{O}F,\hat{D})$ as a function of the single variable $TOF_1$ provides, $$T\tilde{O}F_1 = \dfrac{1}{N}\left(T\hat{O}F_1 + \sum_{i=2}^{N}(T\hat{O}F_i - \hat{D}_{i-1})\right) \quad (118)$$

Figure 19:
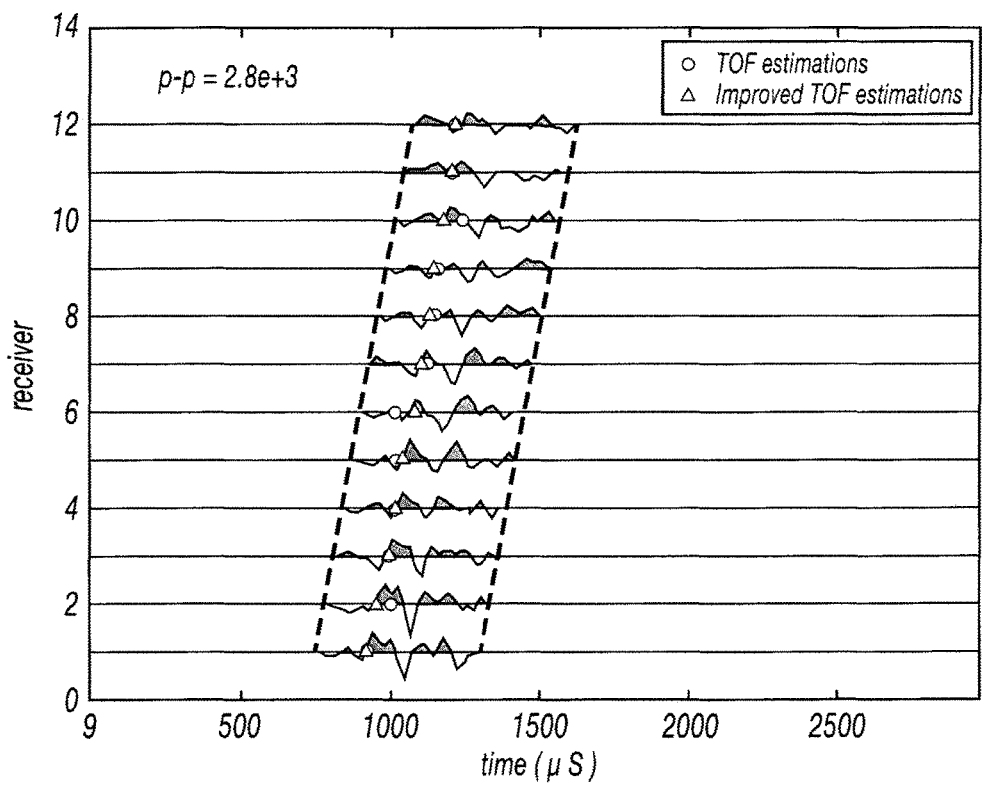
FIG. 19 is a graph illustrating the estimations of P-wave first-arrivals (i.e., TOF) with and without accounting for the time delays.

This expression is very natural since $TOF_1$ is calculated as a mean over all the estimated time of flights delayed by the true delays, so that all the random variables $T\hat{O}F_1$ and $T\hat{O}F_i - \hat{D}_{i-1}$, $i=2, \ldots, N$, have the same mean, the true time of flight $TOF_1$, and the same variance. Accordingly, it is possible to deduce that the variance of the estimator $T\tilde{O}F_1$ is reduced by a factor N compared to the first arrival time-detection algorithm. It is also possible to find this expression by setting $\sigma_1=0$ in the right hand side of Eqn. (114). FIG. 19 is a graph illustrating the estimations of P-wave first-arrivals (i.e., TOF) with and without accounting for the time delays. The dotted lines in FIG. 19 correspond to the window applied to the waveforms set in order to calculate the time delays.

Two-Dimensional (2-D) Filtering

Optionally, the waveforms recorded by the array of acoustic receivers (e.g., the array of acoustic receivers 108 shown in FIG. 1) can be filtered before performing TOF estimations. A common procedure to clean the waveforms and increase the signal to noise ratio is to perform a band-pass frequency filtering on each waveform, centering the filter around the P-waves strongest frequencies. However, this method suffers from several limitations, and is inefficient in improving our ability to estimate times of flight with better ease. First, in order to preserve the concept of first-arrival, it is desirable to restrict to causal filters. Indeed, a frequency filter is performed by doing a convolution in the time domain. If the filter is non-causal, the filtered signal at any time will involve original data at some forward times, making the concept of first-arrival time irrelevant. Secondly, band-pass frequency filtering may reduce the amplitude of the P-wave, since some frequency components of the P-wave will be attenuated. Thirdly, drill noise has a very large spectrum, which overlaps P-waves spectrum, making separation between them in the frequency, domain impossible. As well, P-wave and collar wave spectrum have similar spectra since they are both generated by the acoustic source. Their overlap in both time and frequency domains makes then frequency filtering unable to discard the undesirable collar wave.

For all these reasons, filtering each waveform with a band-pass frequency filter is not the best solution for helping in capturing times of flight. Although it may enable to increase the signal to noise ratio, it is however inefficient in improving the ability of either a human operator or an existing algorithm to estimate accurately first-arrival times. Hence, we need to find a better way to filer the waveforms, which can better discriminate P-waves from drilling noise and other unwanted waves. As described above, one of the difference between P-waves and other waves (e.g., collar waves, S-waves, random tube waves, etc.) is their slowness. Hence, a filter which could be able to perform a band-pass filtering on the slowness rather than on the frequencies may be much more efficient than the basic frequency filtering. But considering the waveforms one by one does not provide any information about the slowness of the recorded waves. However, by using the whole set of waveforms provided by the array of acoustic receivers, it is possible to obtain information about their slowness. Accordingly, a more efficient filtering based on slowness can be to consider a set of waveforms as a two dimensional ("2-D") time-space data array. In order to perform such a two-dimensional filtering, two example methods based on some 2-D dimensional transformations and their inverse are presented. However, it should be understood that this disclosure should not be limited to using F-K filtering or the Radon transform and that other known 2-D filtering algorithms can be used.

F-K Filtering

The classic frequency decomposition for a plane progressive wave is the following, $$P(t,x) = \int_{-\infty}^{+\infty} A(w) e^{i(wt-kx)} dw \quad (119)$$

where A is the amplitude of each frequency component, w is the pulsation ($w=2\pi f$), and k is the wave-number. Substituting such an expression in the wave equation provides a relation between the pulsation and the wave-number, $$\frac{\omega}{k} = v_\phi, \quad (120)$$

where $v_\phi$ is called the phase speed of the wave. Defining the slowness as the inverse of the phase speed, $$\text{slowness} = \frac{k}{\omega}. \quad (121)$$

A common 2-D transformation where this particular relationship between wave-number and pulsation is the two-dimensional Fourier transform, also called the F-K transform, which can be defined as the following, $$\hat{P}(w,k) = \int_{-\infty}^{+\infty} \int_{-\infty}^{+\infty} P(t,x) e^{-i(wt-kx)} dk dw \quad (122)$$

and the corresponding inverse 2-D Fourier transform, $$P(t,x) = \int_{-\infty}^{+\infty} \int_{-\infty}^{+\infty} \hat{P}(w,k) e^{i(wt-kx)} dk dw \quad (123)$$

Identification between the 2-D inverse Fourier transform and the progressive wave frequency decomposition provides, $$\hat{P}(w,k) = A(w)\delta(k-sw), \quad (124)$$

where s is the slowness of the wave. Hence, on the F-K plane, each different type of wave will be located on the curve k=sw. If the waves are non-dispersive, then their slowness is independent of w, and the non-zero Fourier coefficients are located on straight lines which slope is equal to the waves' slowness. All these remarks are valid for either the collar-wave, P-wave, S-wave or any tube wave generated by some shock of the tool against the borehole walls. However, considering drilling noise as a random process without other assumptions, it may be spread on the entire F-K plane. It is then possible to perform an efficient filtering by first zone around the line k=$S_p$·w. It is then possible to set to zero all the Fourier coefficients outside this predefined zone. It is then possible to perform an inverse 2-D Fourier transform in order to go back to the time-space domain and get the filtered waveform set. This procedure should discard all the undesirable waves while preserving all the information about the P-wave, as well as it may remove most part of the drilling noise.

Figure 20:
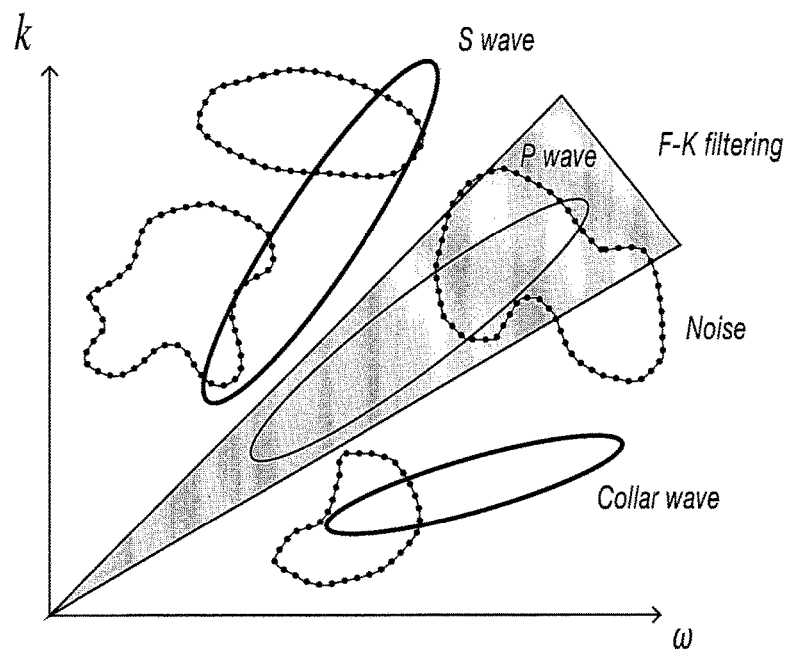
FIG. 20 is a diagram illustrating F-K slowness filtering zone selection
Figure 21:
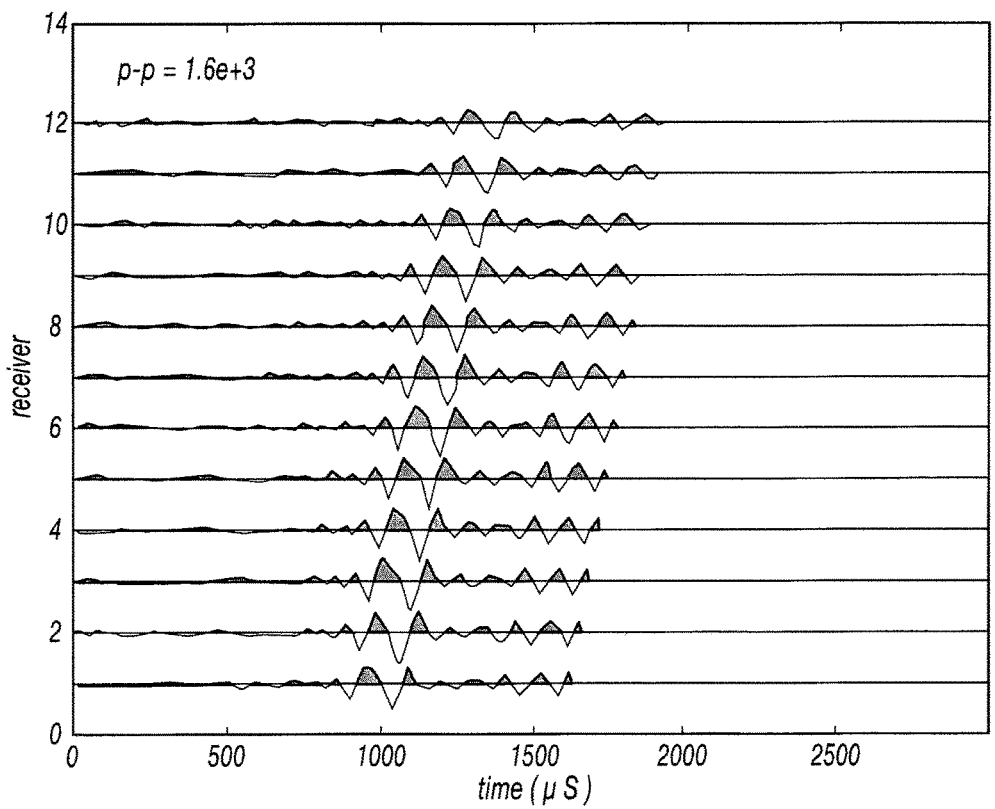
FIG. 21 is a graph illustrating example waveforms after F-K filtering.

There are, however, a few limitations which make 2-D filtering less efficient than what the above theory was predicting. The first limitations are due to the fact that the waveforms are finite length, sampled signals, rather than some signals defined continuously on the entire $R^2$ plane. Hence, what is computed using the 2-D fast Fourier transform is an approximation to the 2-D Fourier transform of such an ideal signal. Hence, there may be some aliasing in the wave-number,domain due to the spacing of the acoustic receivers which is not small enough. Additionally, the finite length nature of the recorded waveform entails that each wave in the F-K plane is not located exactly on the straight lines k=sw, but rather in a certain zone around such lines. Indeed, multiplying a signal defined for all times by a time window makes its Fourier transform convolved by the Fourier transform of the window. Hence, choosing the width of the filtering zone in the F-K plane is a matter of balance between keeping most of P-wave information while discarding other waves and drilling noise. FIG. 20 is a diagram illustrating F-K slowness filtering zone selection. FIG. 21 is a graph illustrating example waveforms after F-K filtering. As shown in FIG. 21, an increase in the signal to noise ratio is shown after F-K filtering. More important, it is now possible to distinguish more easily each of the first-arrival time. Defining the first-arrivals as the zero-crossing occurring just before the first P-wave small amplitude peak seems to be a very good approximation to the true time of flight.

Radon Filtering

Another two dimensional transform which is also widely used in seismic processing as well as image processing, is called the Radon transform. In the specific case of seismic processing, it is sometimes referred to the tau-p transform. It is defined as the following, $$V(\tau,p) = \int_{-\infty}^{+\infty} P(t=\tau+hp, x) dx \quad (125)$$

As its mathematical definition shows, the Radon transform is the calculation of the sum of the signal amplitude along lines which slopes are equal to h. Since a waveform with a specific slowness at each acoustic receiver will be approximately equal to the waveform recorded at the first receiver shifted from a time length proportional to the space between the acoustic receivers, it should be understood that the Radon transform is an appropriate 2-D transform to highlight the presence of non-dispersive waves by looking at the amplitude of the Radon coefficients. Moreover, since there exists an inverse Radon transform, it is also possible to perform the same kind of slowness filtering as was performed using the F-K transform. Again, similar to F-K transform, the computation is performed on finite length sampled signals, which is an approximation of the Radon transform, called the Discrete Radon Transform. As well, since the Radon coefficients are calculated for a finite range of slopes h, it is only possible to compute an approximation to the inverse Radon transform.

Figure 22:
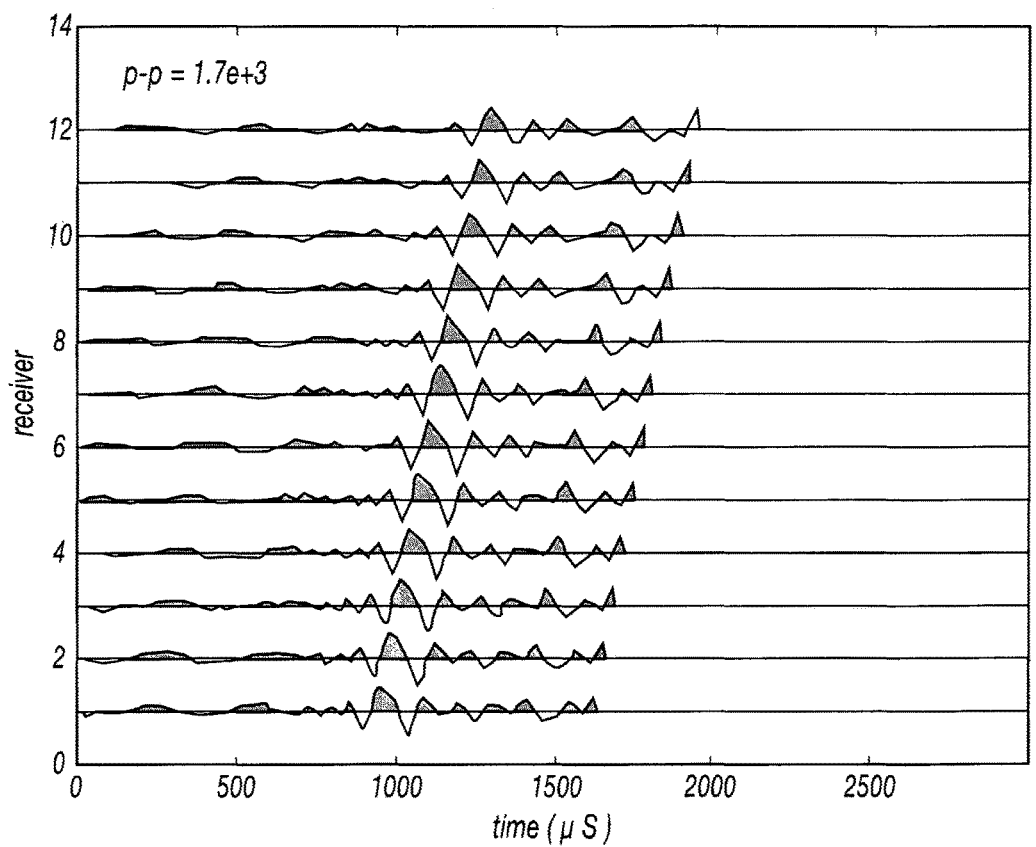
FIG. 22 is a graph illustrating example waveforms after Radon filtering.

The filtering process is similar to the F-K filtering. First, the Radon transform of the whole waveform set is computed. Hence, a rectangular zone defined by h∈[$S_p$−α, $S_p$+α] is defined and all the Radon coefficients outside this predefined zone are set to zero or a flag value. Then, an inverse Radon transform is performed to get the filtered waveforms set. FIG. 22 is a graph illustrating example waveforms after Radon filtering.

P-wave Slowness Determination

Either F-K filtering or Radon filtering need to define a zone where most of the P-wave information is located in the F-K or Radon domains, respectively. As described above, these locations are related to the P-wave slowness. Hence, to perform these 2-D filtering techniques, the approximate P-wave slowness should be known/determined. P-wave slowness can be determined from the time delays calculated using the techniques described above. For example, the time delays relative to the waveform recorded at the first receiver are linked to the P-slowness by, $$D(x) = S_P \cdot x, \quad (126),$$

where x is the position of each acoustic receiver in the acoustic array. Hence, from the time delay estimations, it is possible to deduce an approximate P-slowness by performing a least-square regression on the time delay estimations and then calculating the slope of the linear fit.

Example Operations

Figure 23B:
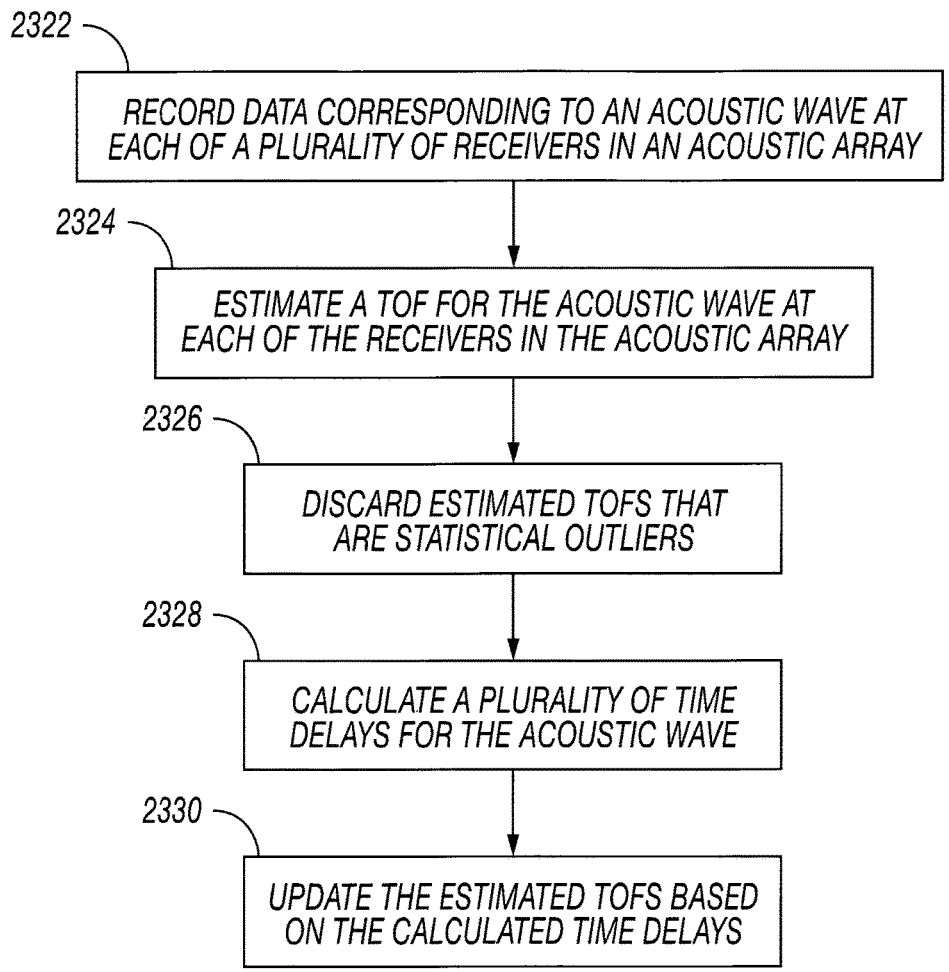

Referring now to FIGS. 23A-23B, flow diagrams illustrating example operations for estimating a TOF for an acoustic wave generated by an acoustic source (e.g., the acoustic source 106 shown in FIG. 1) for each of a plurality of acoustic receivers in an acoustic array (e.g., the acoustic array 108 shown in FIG. 1) are shown. These example operations can provide accurate TOF estimations, even on data experiencing low SNR (e.g., data collected during LWD operations). It should be appreciated that the logical operations described herein with respect to the various figures may be implemerited (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein, are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Referring now to FIG. 23A, a flow diagram illustrating example operations 2300A for estimating a TOF for an acoustic wave generated by an acoustic source for each of a plurality of acoustic receivers in an array is shown. At 2302, data corresponding to an acoustic wave recorded at each of a plurality of acoustic receivers of an acoustic array is received. For example, the acoustic wave can be generated by the acoustic source 106 and recorded by the array of acoustic receivers 108 shown in FIG. 1. This data can be received by the control unit 120 shown in FIG. 1. At 2304, a respective TOF for the acoustic wave at each of the acoustic receivers in the acoustic array can be estimated, for example using a first-arrival time detection algorithm such as the entropy algorithm described above. Then, at 2306, the respective estimated TOFs that are statistical outliers are discarded. For example, a least-squares regression of the estimated TOFs for the acoustic wave at each of the acoustic receivers in the acoustic array can be performed, and a standard deviation of differences between each of the estimated TOFs and respective values of the regression can be calculated. If a difference between a given TOF and the value of the regression exceeds the standard deviation, it can be discarded. By discarding the TOFs that are statistical outliers, it is possible to keep only estimated TOFs that have approximately detected P-wave arrivals.

At 2308, a plurality of time delays for the acoustic wave can be calculated using the non-discarded estimated TOFs, for example, using a high-order statistical algorithm such as a bicoherence correlation algorithm described above. As described above, the time delays are delays between P-wave arrivals at each of the acoustic receivers in the acoustic array relative to the first acoustic receiver in the acoustic array. Optionally, the high-order statistical algorithm can be applied after windowing the recorded data around each of the non-discarded estimated TOFs. By windowing the recorded data, it is possible to ignore data corresponding to S- and Stoneley wave arrivals, for example. Then, the estimated TOFs for the acoustic wave at each of the acoustic receivers in the acoustic array can be updated based on the calculated time delays. This can be accomplished, for example, by solving Eqn. (114) described above. In addition, it is possible to determine P-wave slowness based on the updated TOFs for the acoustic wave at each of the acoustic receivers in the acoustic array. This can be accomplished by performing a least-squares regression on the updated TOFs and calculating a slope of a best-fitting line as described above. At 2310, a determination is made as to whether an absolute value of the difference between the P-wave slowness value for a current iteration (i.e., Sp(i+1) in FIG. 23A) and the P-wave slowness value for a previous iteration (i.e., Sp(i) in FIG. 23A) is less than a predetermined threshold. This disclosure contemplates that the predetermined threshold can be any user-defined value, e.g., the predetermined threshold may be set based on an analysis of the above-noted calculations. If YES, the updated TOF for the acoustic wave can be used as the final values. If NO, at 2312, two-dimensional filtering transform, for example, an F-K transform or a Radon transform can be applied to the recorded data. As described above, P-wave slowness is taken into account when performing two-dimensional filtering. The process can then return to step 2304, where a TOF for the acoustic wave at each of the acoustic receivers in the acoustic array can be estimated.

Referring now to FIG. 23B, a flow diagram illustrating example operations 23006 for estimating a TOF for an acoustic wave generated by an acoustic source for each of a plurality of acoustic receivers in an array is shown. At 2322, data corresponding to an acoustic wave recorded at each of a plurality of acoustic receivers of an acoustic array is received. For example, the acoustic wave can be generated by the acoustic source 106 and recorded by the array of, acoustic receivers 108 shown in FIG. 1. This data can be received by the control unit 120 shown in FIG. 1. At 2324, a respective TOF for the acoustic wave at each of the acoustic receivers in the acoustic array can be estimated, for example using a first-arrival time detection algorithm such as the entropy algorithm described above. Then, at 2326, the respective estimated TOFs that are statistical outliers are discarded. For example, a least-squares regression of the estimated TOFs for the acoustic wave at each of the acoustic receivers in the acoustic array can be performed, and a standard deviation of differences between each of the estimated TOFs and respective values of the regression can be calculated. If a difference between a given TOF and the value of the regression exceeds the standard deviation, it can be discarded. By discarding the TOFs that are statistical outliers, it is possible to keep only estimated TOFs that have approximately detected P-wave arrivals. At 2328, a plurality of time delays for the acoustic wave can be calculated using the non-discarded estimated TOFs, for example, using a high-order statistical algorithm such as a bicoherence correlation algorithm described above. The time delays are delays between P-wave arrivals at each of the acoustic receivers in the acoustic array relative to the first acoustic receiver in the acoustic array. Optionally, the high-order statistical algorithm can be applied after windowing the recorded data around each of the non-discarded estimated TOFs. By windowing the recorded data, it is possible to ignore data corresponding to S- and Stoneley wave arrivals. Then, at 2330, the estimated TOFs for the acoustic wave at each of the acoustic receivers in the acoustic array can be updated based on the calculated time delays. This can be accomplished, for example, by solving Eqn. (114) described above.

Application of the TOF Estimates

Two example applications for the times of flight estimations are described below. The first one is the determination of the P-wave slowness, and the second one is the estimation of the borehole diameter.

P-wave Slowness Estimation

As described above, the times of flight are linear as a function of each receiver position, $$TOF(x) = TOF(0) + S_P \cdot x. \tag{127}$$

Hence, from the times of flight estimations provided by the algorithm output, it is possible to deduce the P-wave slowness by performing a least-square regression and calculating the slope of the linear fit.

Figure 24:
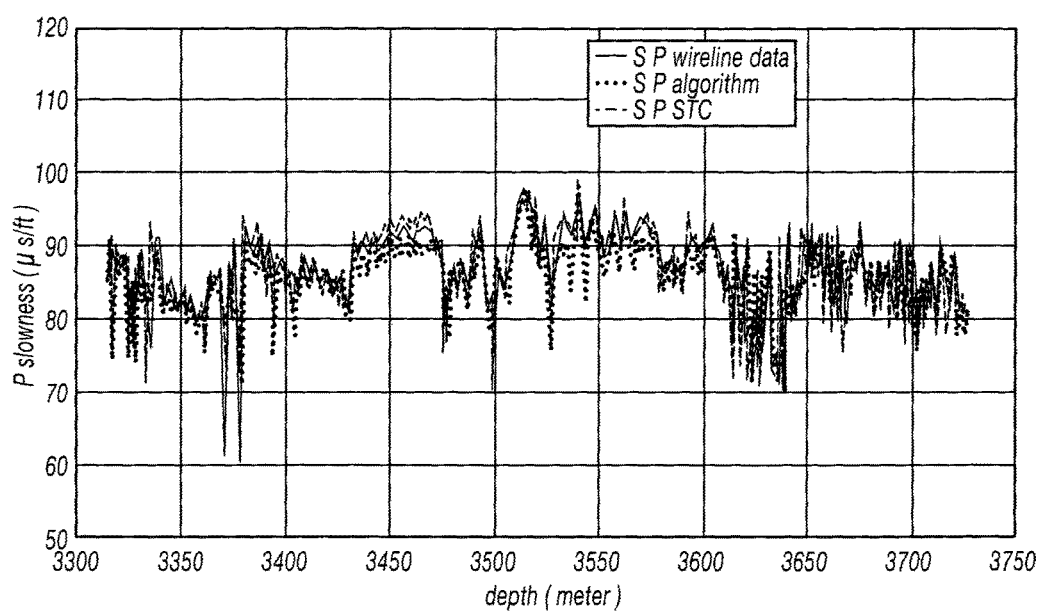
FIG. 24 is a graph illustrating P-wave slowness estimations using a Slowness Time Coherence algorithm ("STC") on wireline data (solid), the STC algorithm on D&M data (dashed), and the techniques described herein on the D&M data (dotted).

For example, this technique was applied on example D&M data from a well in Australia. FIG. 24 is a graph illustrating P-wave slowness estimations using a STC on wireline data (solid), the STC algorithm on D&M data (dashed), and the algorithm described herein on the D&M data (dotted). FIG. 24 shows that the P-slowness estimation according to the techniques described herein is reliable since it manages to follow the trend of bdth wireline and D&M STC estimations. The difference between the D&M STC output and our algorithm output remains most of the time below 2 μs/feet, which is a reasonable accuracy. Stating which log provides the most accurate P-slowness estimations is out the scope of this report however.

Mud Slowness and Borehole Diameter Estimations

Times of flight estimations (e.g., according to the techniques described herein) can be used in order to determine the borehole diameter. An example technique is described below. Consider a borehole of diameter d filled with a fluid in which acoustic waves propagate with the slowness $s_f$. The borehole is surrounded by few cylindrical layers, each layer i having a thickness $H_i$ and a P-wave slowness $S_i$. Using the ray tracing theory described above, it is possible to calculate the minimum transmitter-receiver spacing $x_i$ for a P-wave to be able to reach the receiver after having traveled into the formation until the layer $H_i$.

$$x_i = 2\left( \frac{s}{\sqrt{\frac{s_f^2}{S_i^2} - 1}} + \sum_{j=1}^{i-1} \frac{H_j}{\sqrt{\frac{s_f^2}{S_j^2} - 1}} \right), \tag{128}$$

where s is the standoff, which is the distance between the sonic tool and the borehole walls. It is linked to the borehole diameter d by, $$s = \frac{d - d_{tool}}{2}. \tag{129}$$

Hence, at a receiver located in $X_i$ such that $x_i < X_i < x_{i+1}$, i P-wave arrivals will be recorded, each having a time of flight, $$TOF_l = 2ss_f\left(1 - \frac{S_l^2}{s_f^2}\right)^{-1/2} + 2\sum_{j=1}^{l-1} S_j H_j \left(1 - \frac{S_l^2}{S_j^2}\right)^{1/2} + \frac{X_i - x_l}{V_l}, \tag{130}$$

$$l = 1, \ldots, i$$

The first arrival time TOF recorded at this receiver corresponds to the P head wave which has the shortest time of flight, TOF=min(TOF$_l$, l=1, . . . , i). Radial profiling can provide estimations of the layer thickness $H_i$ and the corresponding velocities $V_i$. Noting m=(s$_f$,d) and TOF= (TOF$_1$, . . . , TOF$_N$), then consider the times of flight as a function of these only two variables, TOF=G(m). An equation which involves both the times of flight estimations and the borehole diameter can be found. Actually, this is a set of equations which are all linked. However, a second unknown, the mud velocity $s_f$, makes this system unsolvable if no further information involving the borehole diameter or the mud slowness is known. For the mud slowness, an approximate value provided by the mud supplier can be used. As well, the borehole diameter should be approximately equal to the bit-size. The ray tracing equation, together with the mathematical transcription of the last statement, can be summarized in, a non-linear system of three equations for two unknowns.

$$\begin{cases} TOF = G(s_f, d) + \xi_{TOF} \\ s_f = \hat{s}_f + \xi_{s_f} \\ d = \hat{d} + \xi_d \end{cases}, \tag{131}$$

where $\hat{s}_f$ is the mud slowness provided by the supplier and $\xi_{s_f}$ the uncertainty on it, and $\hat{d}$ is the bit size and $\xi_d$ the uncertainty of the borehole diameter compared to the bit size.

Accordingly, there are three independent equations for only two parameters. There are also uncertainties on all the estimated parameters involved in each equation. In order to get the solution to this inverse problem, ($s_f$,d), which fits the best with all the known data, i.e., the bit size, the mud approximate mud slowness $\hat{s}_f$ and the estimated time of flights at each receivers TOF, it is possible to solve this problem by maximizing the joint a posteriori distribution of the model ($s_f$,d), to fit with the available data. This statistical optimization problem is similar to the one solved above to improve the accuracy on times of flight estimations using the estimated delays by solving an over-determined system. For example, $$P(s_f, d | \hat{d}, \hat{s}_f, TOF) = \frac{P(TOF | s_f, d, \hat{s}_f, \hat{d}) P(s_f, d | \hat{v}_f, \hat{d})}{P(TOF | \hat{s}_f, \hat{d})} \tag{132}$$

$$= \frac{P(TOF | s_f, d) P(s_f | \hat{s}_f) P(d | \hat{d})}{P(TOF | \hat{s}_f, \hat{d})},$$

where independence between some variables is taken into account. The objective is to maximize this function in the variables $s_f$ and d. Since the denominator does not depend on these two parameters, the object is to maximize, $$f(s_f, d) = P(TOF | s_f, d) P(s_f | \hat{s}_f) P(d | \hat{d}). \tag{133}$$

The calculation of the three terms in the right hand side of Eqn. (133) is described below.

Expression of the Likelihood Function

The first term $P(TOF|s_f,d)$ can be calculated in assuming that the error vector on the estimation TOF is composed of independent identically distributed Gaussian variables, with zero mean and variance σ. Hence, similarly as described above, $$P(TOF | s_f, d) = \frac{1}{(2\pi)^{N/2} \sigma^N} \exp\left( -\frac{\|TOF - G(s_f, d)\|^2}{2\sigma^{2N}} \right) \tag{134}$$

Expression of the Mud Slowness Probability Distribution

A log-normal distribution was suggested for the mud slowness probability distribution, $$P(s_f \mid \hat{s}_f) = \frac{1}{s_f \sigma_{ln} \sqrt{2\pi}} \exp\left(-\frac{(\ln(s_f) - \mu)^2}{2\sigma_{ln}^2}\right) \quad (135)$$

The parameters $\mu$ and $\lambda$ can be found from the mean and the variance of the mud slowness distribution, respectively equal to $\hat{s}_f$ and $\sigma_{s_f}^2$, by the following relationships, $$\begin{cases} \mu = \ln(\hat{s}_f) - \frac{1}{2}\ln\left(1 + \frac{\sigma_{s_f}^2}{\hat{s}_f^2}\right), \\ \sigma_{ln}^2 = \ln\left(1 + \frac{\sigma_{s_f}^2}{\hat{s}_f^2}\right). \end{cases} \quad (136)$$

Expression of the Diameter Probability Distribution

A Gaussian distribution was suggested for the diameter probability distribution.

$$P(d \mid \hat{d}) = \frac{1}{\sqrt{2\pi}\,\sigma_d} \exp\left(-\frac{(d - \hat{d})^2}{2\sigma_d^2}\right) \quad (137)$$

Such a distribution may seem to be inappropriate since the borehole diameter cannot be smaller than the bit size $\hat{d}$. The easiest way for avoiding this paradox is to simply maximize the function f on the constrained set $\hat{d} \geq d$ Maximization of the function f is equivalent to look for the maximum of, $$h(s_f, d) = \frac{1}{s_f} \exp\left(-\frac{\|TOF - G(s_f, d)\|^2}{2\sigma^{2N}} - \frac{(\ln(s_f) - \mu)^2}{2\sigma_{ln}^2} - \frac{(d - \hat{d})^2}{2\sigma_d^2}\right). \quad (138)$$

Finding the suitable couple $(\hat{s}_f, \hat{s})$ cannot be performed analytically, since the function h is not a simple quadratic function. However, many algorithms are known to solve such a constrained ($\hat{d} \geq d$) optimization problem.

Validation

First, it is desirable to verify whether the techniques for estimating borehole diameter and mud slowness described above are valid. Particularly, it is desirable to verify if the solution to the optimization problem described above results in relevant estimations of the borehole diameter or mud slowness $s_f$. Hence, the problem can be solved using synthetic times of flights, which are calculated by ray tracing with the formula shown by Eqn. (130). For the mud slowness, the mean $\hat{s}_f$ is chosen, whereas for the borehole diameter, the mean value provided by the two calipers used during wireline logging of the well is chosen.

Figure 25A:
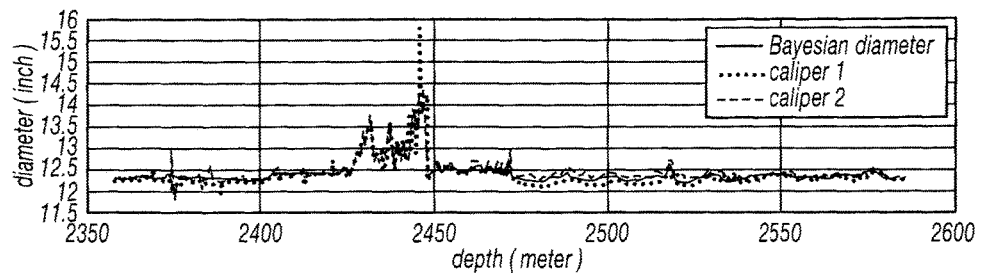
FIG. 25A is a graph illustrating the borehole diameter estimation using the Bayesian method with synthetic times of flight.
Figure 25B:
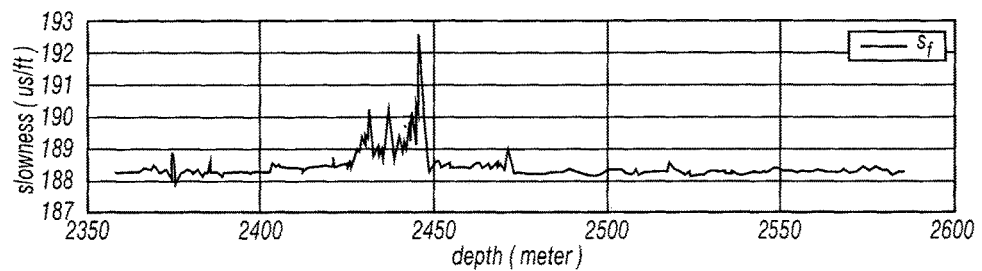
FIG. 25B is a graph illustrating the mud slowness estimation using the Bayesian method with synthetic times of flight.

Solutions to the optimization problem for a given range of depth are shown in FIGS. 25A-25B. In particular, FIG. 25A is a graph illustrating the borehole diameter estimation using the Bayesian method with synthetic times of flight, and FIG. 25B is a graph illustrating the mud slowness estimations using the Bayesian method with synthetic times of flight. FIG. 25A shows that borehole diameter estimation is extremely close to the caliper values. Therefore, the technique accurately estimates the borehole diameter. FIG. 25B shows that mud slowness estimation variations are exactly the same as the borehole diameter. This could be surprising at a first, but thinking about the way this problem is solved, it should be understood that this is the price to pay for estimating two unknowns from only one equation. Indeed, the main term in the ray tracing equation, $2s \cdot s_f$ is symmetric in the borehole diameter and the mud slowness, resulting in that for maximizing the function f, the variations $\hat{s}_f - \hat{s}_f$ and $\hat{d} - \hat{d}$ are proportional.

Application to Field Data

Figure 26:
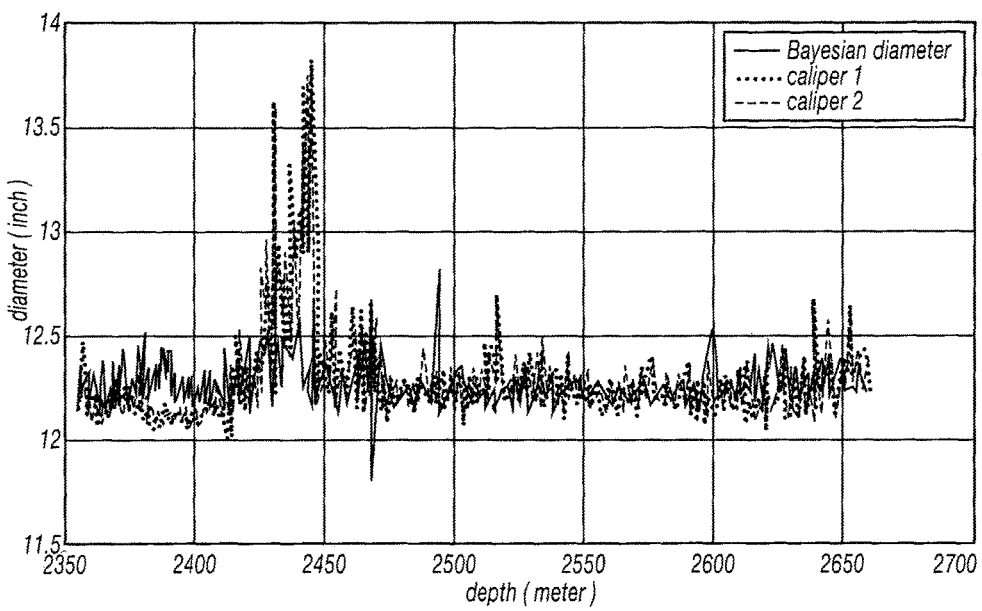
FIG. 26 is a graph illustrating borehole diameter estimations using the Bayesian technique described herein (solid) compared to borehole diameter estimations using a density tool (dotted/dashed).
Figure 27:
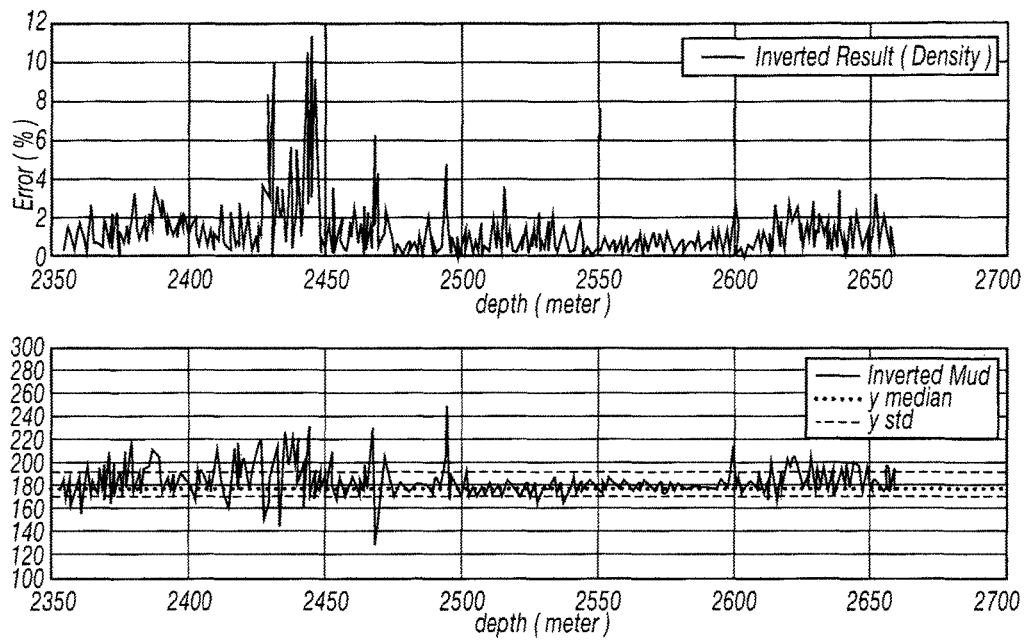
FIG. 27 is a graph illustrating the absolute error in percent between borehole diameter estimations using the Bayesian technique described herein and borehole diameter estimations using the density tool.

Described below are comparisons between the borehole estimations according to the technique described above and other known techniques for estimating the borehole diameter. FIG. 26 is a graph illustrating borehole diameter estimations using the Bayesian technique described above (solid) compared to borehole diameter estimations using a density tool (dotted/dashed). FIG. 26 shows that acoustic caliper is close to the one estimated from the drilling density tool. FIG. 27 is a graph illustrating the absolute error in percent between borehole diameter estimations using the Bayesian technique described above and borehole diameter estimations using the density tool. As shown in FIG. 27, the error is overall less than 2 percent except at one position where the error is higher. This can be understood by looking at the mud estimate which is estimated with a high error. Correction of the mud error using mean and standard deviation would help identifying such large error hence improving caliper estimates. However, it is worth noticing that obtained errors are still very good in view of the challenging environment while drilling.

Figure 28:
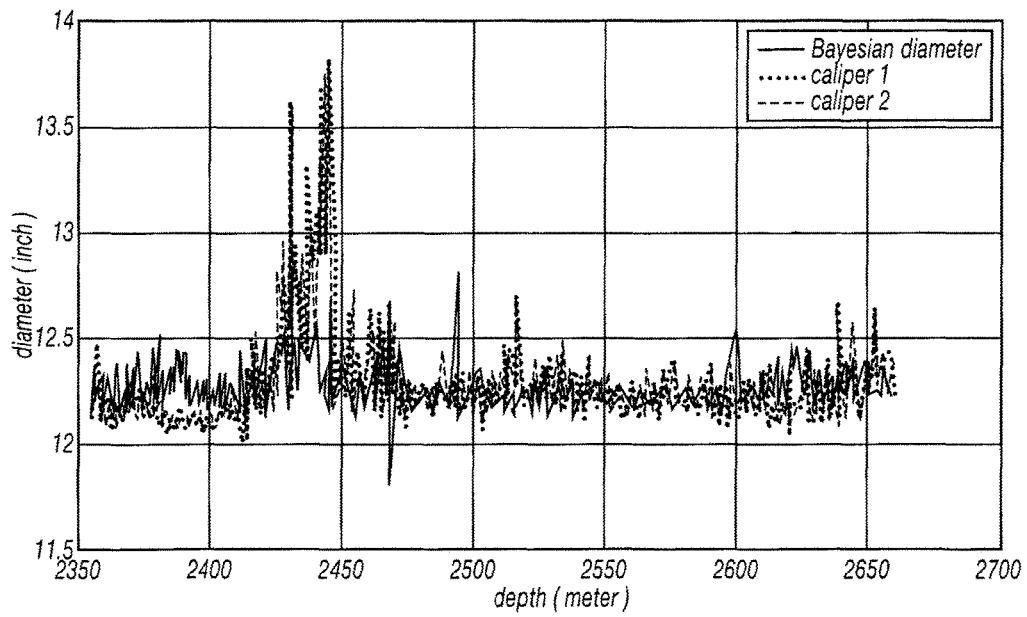
FIG. 28 is a graph illustrating borehole diameter estimations using the Bayesian technique described herein compared to a mechanical wireline caliper obtained after the well was drilled.
Figure 29:
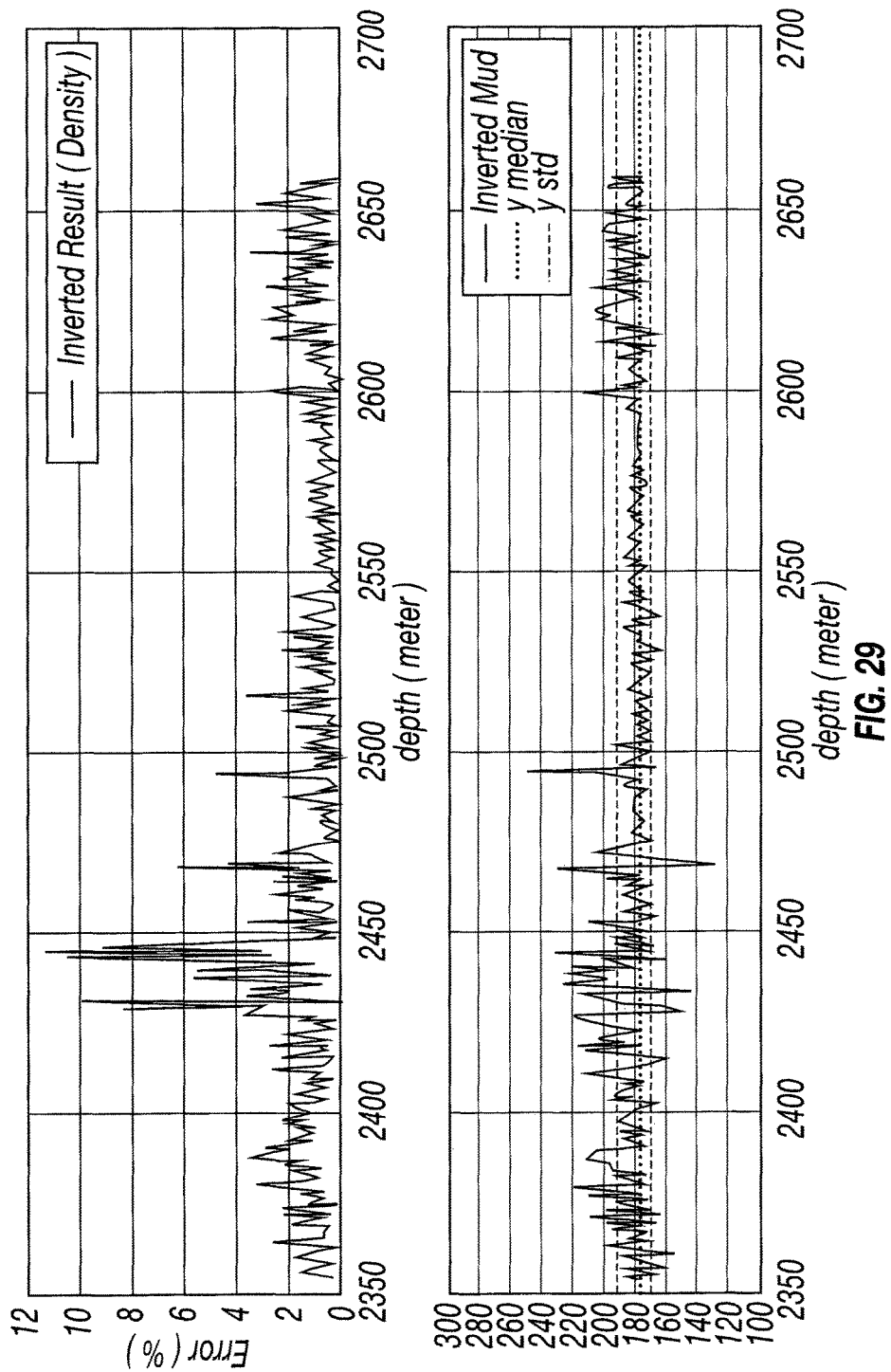
FIG. 29 is a graph illustrating the absolute error in percent between borehole diameter estimations using the Bayesian technique described herein and the mechanical wireline caliper.

FIG. 28 is a graph illustrating borehole diameter estimations using the Bayesian technique described above compared to a mechanical wireline caliper obtained after the well was drilled. FIG. 29 is a graph illustrating the absolute error in percent between borehole diameter estimations using the Bayesian technique described above and the mechanical wireline caliper. FIG. 29 shows that difference is overall less than 2 percent except at one position where the error is higher. This can be understood by looking at the mud estimate which is estimated with a high error. Correction of the mud error using mean and standard deviation would help identifying such large error hence improving caliper estimates. However, it is worth noticing that obtained errors are still very good in view of the challenging environment while drilling.

CONCLUSION

The techniques described herein managed to achieve high accuracy and robustness in estimating times of flight on D&M acoustic monopole data experiencing a very low signal to noise ratio. This have been possible due to some procedures such as the outliers detection, as well as more complex signal processing tools such as the bicoherence-correlation function. As described above, each step of the technique may be requirement for the following step of the technique to process the data. Outlier detection enables the ability to discard the first-arrival estimations which missed P-wave arrivals, which is aids in properly windowing the waveforms and be sure to process only P-waves and then calculate the relevant delays. While delays are useful to improve times of flight estimations thanks to the robustness to correlated noise of the bicoherence-correlation, the delays also provide an estimation of the P-wave slowness. This value can be used to perform a two dimensional slowness filtering by the use of either Fourier or Radon transform. This type of filtering can be very useful, as it increases greatly the signal to noise ratio and makes highly accurate times of flight detection possible.

Deducing compressional slowness from times of flight is straightforward, and the techniques described above managed to provide a log very close to ones obtain using the standard Slowness Time Coherence algorithm. This highlights the reliability of the techniques since such accurate slowness estimations could not be performed if the first-arrival times were not calculated with high accuracy.

Example applications for the estimated TOFs according to the techniques described herein, e.g., the borehole diameter and mud slowness determinations, are also possible. Borehole diameter and mud slowness estimations were conducted on real data, which demonstrated that the combination of the accurate and robust first motion detection techniques described herein coupled with a Bayesian inversion allows to provide a reliable estimate of the borehole diameter as well as mud slowness. Application to real data and comparison with other tools used to estimate hole diameter illustrated the efficiency and robustness as described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for estimating a time of flight (TOF) for an acoustic wave generated by an acoustic source for each of a plurality of acoustic receivers in an array, the method comprising:
    estimating a respective TOF based on recorded data corresponding to the acoustic wave received at each of the acoustic receivers;
    discarding one or more of the respective estimated TOFs, wherein each of the discarded TOFs is a statistical outlier;
    defining a window for the recorded data based on an arrival time associated with a wave type for the acoustic wave;
    calculating a plurality of time delays for the acoustic wave including the wave type associated with the window using a plurality of non-discarded estimated TOFs, wherein each of the time delays is a difference between respective estimated TOFs for the acoustic wave for at least two of the acoustic receivers; and
    updating the respective non-discarded estimated TOFs for the acoustic wave for each of the acoustic receivers using the calculated time delays.

2. The method of claim 1, further comprising:
    determining a compressional wave (P-wave) slowness value based on the calculated time delays;
    filtering the recorded data using a two-dimensional filtering transform based on the P-wave slowness value; and
    estimating the respective TOFs using the filtered recorded data.

3. The method of claim 2, wherein the two-dimensional filtering transform includes at least one of an F-K transform or a Radon transform.

4. The method of claim 1, wherein estimating a TOF for the acoustic wave for each of the acoustic receivers further comprises using a first-arrival time detection algorithm.

5. The method of claim 1, wherein calculating a plurality of time delays for the acoustic wave further comprises using a high-order statistical algorithm.

6. The method of claim 1, wherein discarding one or more of the respective estimated TOFs further comprises:
    performing a least-squares regression on the respective estimated TOFs;
    calculating a standard deviation of differences between the respective estimated TOFs and respective values of the least-squares regression for the acoustic wave for each of the acoustic receivers; and
    if an absolute value of a difference between an estimated TOF for the acoustic wave for a given acoustic receiver and a value of the least-squares regression for the acoustic wave for the given acoustic receiver is greater than the standard deviation, discarding the estimated TOF for the acoustic wave for the given receiver.

7. The method of claim 1, wherein defining the window further comprises upon discarding one or more of the respective estimated TOFs, windowing respective portions of the recorded data corresponding to the acoustic wave for each of the acoustic receivers around each of the non-discarded estimated TOFs and disregarding data outside each of the respective windowed portions.

8. The method of claim 1, further comprising determining a compressional wave (P-wave) slowness value based on the updated TOFs for the acoustic wave for each of the acoustic receivers.

9. The method of claim 8, wherein determining a compressional wave (P-wave) slowness value based on the updated TOFs for the acoustic wave for each of the acoustic receivers further comprises:
    performing a least-squares regression on the updated TOFs; and
    calculating a slope of a best-fitting line obtained by the least-squares regression.

10. The method of claim 9, further comprising adjusting an estimation of at least one of a value of a diameter of a borehole or a mud slowness value based on the updated TOFs for the acoustic wave for each of the acoustic receivers.

11. A system for estimating a time of flight (TOF) for an acoustic wave, the system comprising:
    an acoustic tool including at least one acoustic source configured to generate an acoustic wave and an array including a plurality of acoustic receivers; and
    a control unit comprising at least one processor and a memory, wherein the control unit is configured to:
        receive data corresponding to the acoustic wave recorded at each of the acoustic receivers;
        estimate a respective TOF for the acoustic wave for each of the acoustic receivers;
        discard one or more of the respective estimated TOFs, wherein each of the discarded TOFs is a statistical outlier;
        define a window for the recorded data based on an arrival time associated with a wave type for the acoustic wave;
        calculate a plurality of time delays for the acoustic wave including the wave type associated with the window using a plurality of non-discarded estimated TOFs, wherein each of the time delays is a difference between respective estimated TOFs for the acoustic wave for at least two of the acoustic receivers; and
        update the respective non-discarded estimated TOFs for the acoustic wave for each of the acoustic receivers using the calculated time delays.

12. The system of claim 11, wherein the control unit is further configured to:
    determine a compressional wave (P-wave) slowness value based on the calculated time delays;

filter the received data using a two-dimensional filtering transform based on the P-wave slowness value; and estimate the respective TOFs using the filtered recorded data.

13. The system of claim 12, wherein the two-dimensional filtering transform includes at least one of an F-K transform or a Radon transform.

14. The system of claim 11, wherein the control unit is to estimate a TOF for the acoustic wave for each of the acoustic receivers using a first-arrival time detection algorithm.

15. The system of claim 11, wherein the control unit is to calculate a plurality of time delays for the acoustic wave using a high-order statistical algorithm.

16. The system of claim 11, wherein the control unit is to discard one or more of the respective estimated TOFs by:

performing a least-squares regression on the respective estimated TOFs;

calculating a standard deviation of differences between the respective estimated TOFs and respective values of the least-squares regression for the acoustic wave for each of the acoustic receivers; and if an absolute value of a difference between an estimated TOF for the acoustic wave for a given acoustic receiver and a value of the least-squares regression for the acoustic wave for the given acoustic receiver is greater than the standard deviation, discarding the estimated TOF for the acoustic wave for the given receiver.

17. The system of claim 11, wherein the control unit is to define the window by, upon discarding one or more of the respective estimated TOFs, window respective portions of the recorded data corresponding to the acoustic wave for each of the acoustic receivers around each of the non-discarded estimated TOFs and disregard data outside each of the respective windowed portions.

18. The system of claim 11, wherein the control unit is to determine a compressional wave (P-wave) slowness value based on the updated TOFs for the acoustic wave for each of the acoustic receivers.

19. The system of claim 18, wherein the control unit is to determine a compressional wave (P-wave) slowness value based on the updated TOFs for the acoustic wave for each of the acoustic receivers by:

performing a least-squares regression on the updated TOFs; and calculating a slope of a best-fitting line obtained by the least-squares regression.

20. The system of claim 19, wherein the control unit is to adjust an estimation of at least one of a value of a diameter of a borehole or a mud slowness value based on the updated TOFs for the acoustic wave for each of the acoustic receivers.

* * * * *